US012748179B2

(12) United States Patent
Ryoo

(10) Patent No.: US 12,748,179 B2
(45) Date of Patent: Sep. 29, 2026

(54) BIOMETRIC SIGNAL DETECTION DEVICE FOR OCCUPANT IN CABIN AND CONTROL METHOD OF SAME DEVICE

(71) Applicant: LG ELECTRONICS INC., Seoul (KR)

(72) Inventor: Kgiwung Ryoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 18/859,423

(22) PCT Filed: Oct. 12, 2022

(86) PCT No.: PCT/KR2022/015402
§ 371 (c)(1),
(2) Date: Oct. 23, 2024

(87) PCT Pub. No.: WO2024/080397
PCT Pub. Date: Apr. 18, 2024

(65) Prior Publication Data
US 2025/0271542 A1 Aug. 28, 2025

(51) Int. Cl.
*G01S 7/03* (2006.01)
*G01S 13/89* (2006.01)
*G01S 17/89* (2020.01)

(52) U.S. Cl.
CPC ................ *G01S 7/03* (2013.01); *G01S 13/89* (2013.01); *G01S 17/89* (2013.01)

(58) Field of Classification Search
CPC combination set(s) only.
See application file for complete search history.

(56) References Cited

U.S. PATENT DOCUMENTS

2006/0208169 A1* 9/2006 Breed .................. B60N 2/0022
250/221

FOREIGN PATENT DOCUMENTS

| | | | |
|---|---|---|---|
| JP | 2019-200544 | A | 11/2019 |
| KR | 10-2020-0039135 | A | 4/2020 |
| KR | 10-2167292 | B1 | 10/2020 |
| KR | 10-2021-0043039 | A | 4/2021 |
| KR | 10-2022-0109114 | A | 8/2022 |

* cited by examiner

*Primary Examiner* — Olumide Ajibade Akonai
*Assistant Examiner* — Eric K Hodac
(74) *Attorney, Agent, or Firm* — Birch, Stewart, Kolasch & Birch, LLP

(57) ABSTRACT

The present invention relates to a device for detecting biometric signal of an occupant in a cabin of a vehicle, the device including: an interface part for receiving vehicle information, and information obtained by detecting occupants in a cabin; a detection signal transmission and reception part which includes a plurality of antennas; and a control part for controlling the detection signal transmission and reception part to detect the number of the occupants and locations of the occupants, distribute the plurality of antennas, detect a vehicle state including at least one of vibration, tilt, and movement of the vehicle, and modulate and transmit at least one of signal properties of the detection signal related to biometric signal detection sensitivity of the occupants.

19 Claims, 10 Drawing Sheets

(a)

(b)

BIOMETRIC SIGNAL DETECTION DEVICE FOR OCCUPANT IN CABIN AND CONTROL METHOD OF SAME DEVICE

CROSS REFERENCE TO RELATED APPLICATIONS

This application is the National Phase of PCT International Application No. PCT/KR2022/015402, filed on Oct. 12, 2022, all of which is hereby expressly incorporated by reference into the present application.

TECHNICAL FIELD

The present disclosure relates to a device for detecting occupants including a driver and a passenger who ride within a cabin of a vehicle and, more particularly, to a device for detecting a signaling of the occupant within the cabin.

BACKGROUND ART

In recent years, technologies have emerged that detect the states of a driver and a passenger (each hereinafter referred to as an occupant) who rides in a vehicle and, according to the detected state, recommend rest to the occupant or arrange a medical service. As a result, the occupant's body, lift, and health can be protected. In order to protect the occupant, there is a growing trend to equip vehicle with various sensors for detecting the occupant's signaling. Various methods are under development to more effectively detecting the occupant's signaling without causing discomfort.

Among these methods, two main approaches have emerged: a signaling monitoring approach based on a non-contact sensor and a signaling reception approach. In the former, a radar signal or a Light Detection and Ranging (Lida R) signal is sent out, a reflection signal reflected from the occupant is detected, and the occupant's signaling is monitored. In the latter, the signaling monitored by each wearable device is received from the wearable device worn by each occupant.

The approach that uses the wearable device has the advantage of enabling the detection of the signaling through the wearable device worn on the occupant's body, thereby providing a high degree of precision. However, this approach has the disadvantage that each occupant must wear the wearable device capable of communicating with a main system of the vehicle, thereby requiring the wearable device to remain worn while riding in the vehicle. In contrast, the monitoring approach based on the non-contact sensor has a lower level of precision than the approach that uses the wearable device. However, this approach has the advantage of eliminating the need for an additional device to remain worn and facilitating the monitoring of the occupant's state without the occupant's awareness. In recent years, there has been a trend for the occupant monitoring approach based on the non-contact sensor to gain significant attention due to the disadvantage of the monitoring approach based on the wearable device and the advantage of the monitoring approach based on the non-contact sensor.

However, the occupant monitoring approach based on the non-contact sensor has the problem of being significantly influenced by the driven state of the vehicle. That is, in the case of the occupant monitoring approach based on the non-contact sensor, the occupant's state is monitored based on a reflection signal resulting from a radar signal or Lida R signal being sent out and reflected from the occupant. At this point, in a case where vibration occurs due to a driven state of the vehicle or where a vehicle body is inclined in a specific direction due to road conditions, the occupant riding in the vehicle is shaken along with the vehicle. Consequently, the vibration caused by the driven state or inclination of the vehicle may be included in the reflection signal resulting from the radar signal or the Lida R signal reflecting from the occupant. Accordingly, disturbances may affect the reflection signal, causing errors in the result of detecting the occupant's signaling. Furthermore, this leads to the problem that the precision of the result of monitoring the occupant's state decreases.

DISCLOSURE OF INVENTION

Technical Problem

An object of the present disclosure, which is made to address the above-mentioned problem and other related problems, is to provide an occupant biosignal monitoring device and an occupant biosignal monitoring method, which are based on a non-contact sensor, the device and method being capable of detecting an occupant's biosignal in a more precise and stable manner.

Another object of the present disclosure is to provide an occupant biosignal monitoring device and an occupant biosignal monitoring method, which are based on a non-contact sensor, the device and method being capable of suppressing disturbances due to a driven state of a vehicle and detecting an occupant's biosignal regardless of the driven state of the vehicle.

Solution to Problem

In order to accomplish the above-mentioned objects and other related objects, according to one aspect of the present disclosure, there is provided a biosignal detection device for detecting a biosignal of an occupant within a cabin of a vehicle, the biosignal detection device including: an interface unit that receives, from the vehicle, vehicular information about the vehicle's posture, inclination, and movement, and occupant detection information obtained by detecting the occupant within the cabin; a detection signal transmission and reception unit that includes a plurality of antennas, sends out a detection signal for detecting the biosignal of each occupant within the cabin, and receives the detection signal reflected from the occupant's body; and a control unit that controls the detection signal transmission and reception unit in such a manner that the number of the occupants within the cabin and the location of each occupant are detected based on the occupant detection information, that the plurality of antennas is distributed according to the number and locations of the detected occupants in a manner that corresponds to each occupant, that a vehicular state including at least one of the following: the vehicle's vibration, inclination, or movement, is detected based on the vehicular information, and that, based on the detected vehicular state, at least one of the signal characteristics of the detection signal, associated with the detection sensitivity of the occupant's biosignal, are modulated and sent out.

In an embodiment, in the biosignal detection device, the control unit may control the detection signal transmission and reception unit in such a manner as to preprocess the received detection signal based on the detected vehicular state before detecting the occupant's biosignal from the detection signal reflected from the occupant's body and received.

In an embodiment, in the biosignal detection device, the detection signal transmission and reception unit may include: at least one filter; and a preprocessing unit that includes an amplification unit amplifying the reception gain of the received detection signal, and the control unit may change at least one of the following: a range of frequency bands, which are allowed to pass through the at least one filter, or the amplification gain of the amplification unit, based on the detected vehicular state, in such a manner that the detection sensitivity of the occupant's biosignal increases or decreases.

In an embodiment, in the biosignal detection device, the control unit may control the preprocessing unit in such a manner that, when at least one of the following increases: the vehicle's vibration, inclination, or movement, the range of frequency bands, which are allowed to pass through the at least one filter, is narrowed or that the amplification gain decreases, and the control unit may control the preprocessing unit in such a manner that, when at least one of the following decreases: the vehicle's vibration, inclination, or movement, the range of frequency bands, which are allowed to pass through the at least one filter, is broadened or that the amplification gain increases.

In an embodiment, in the biosignal detection device, the signal characteristics of the detection signal may include at least one of the following: the number of unit signals constituting one frame of the detection signal, the bandwidth of the unit signal, the period of the detection signal to be sent out, or the amplitude of the detection signal.

In an embodiment, in the biosignal detection device, the control unit may control the detection signal transmission and reception unit in such a manner that, when at least one of the following increases: the vehicle's vibration, inclination, or movement, at least one of the following decreases: the number of unit signals constituting one frame of the detection signal or the amplitude of the detection signal or that the sending-out period of the detection signal or the bandwidth of the unit signal increases, and the control unit may control the detection signal transmission and reception unit in such a manner that, when at least one of the following decreases: the vehicle's vibration, inclination, or movement, at least one of the following increases: the number of unit signals constituting one frame of the detection signal or the amplitude of the detection signal or that the sending-out period of the detection signal or the bandwidth of the unit signal decreases.

In an embodiment, in the biosignal detection device, the control unit may control the detection signal transmission and reception unit in such a manner that the time (Ramp End Time) corresponding to the unit signal within the one frame is changed to vary the number of the unit signals constituting the one frame, or that at least one of the following: a time interval (idle time) between frames of the detection signals, TX Start Time of the detection signal, or Analog-Digital Converting (ADC) Start Time is changed to vary the sending-out period of the detection signal.

In an embodiment, in the biosignal detection device, the vehicular information may include vehicular driving information, including information about the vehicle's traveling direction, speed change, rotation direction, and rotational angle, and vehicular posture information about the vehicle's posture and inclination.

In an embodiment, in the biosignal detection device, the control unit may control the detection signal transmission and reception unit in such a manner that each occupant's posture is determined from the occupant detection information and that the number of the antennas distributed to each occupant is varied based on each occupant's determined posture.

In an embodiment, in the biosignal detection device, the control unit may detect a distance between each occupant's shoulders from each occupant's image included in the occupant detection information and may determine each occupant's posture based on the detected distance between each occupant's shoulders.

In an embodiment, in the biosignal detection device, the detection signal transmission and reception unit may be a radar unit that sends out a radar signal and receives the radar signal reflected from the occupant's body, and the unit signal may be a chirp signal whose frequency increases over time.

In an embodiment, in the biosignal detection device, the detection signal transmission and reception unit may be a LIDAR unit that sends out and receives a LIDAR signal in order to detect the occupant's biosignal.

In an embodiment, the biosignal detection device may further include an artificial intelligence unit that, when a scheduled travel path for the vehicle is set, predicts at least one of the following: the vehicle's vibration, inclination, or movement on one section of a path that the vehicle will travel after a preset time, from the set scheduled travel path, wherein, in a case where the vehicle enters one section of the scheduled travel path, the control unit controls the detection signal transmission and reception unit based on at least one of the following: the vehicle's vibration, inclination, or movement, each of which is predicted through the artificial intelligence unit.

In order to accomplish the above-mentioned objects and other related objects, according to another aspect of the present disclosure, there is provided a method of controlling a biosignal detection device for detecting a biosignal of an occupant riding in a cabin of a vehicle, the method including: a step of receiving, from the vehicle, occupant detection information obtained by detecting the occupant; a step of distributing a plurality of antennas, which transmit and receive a detection signal for detecting the occupant's biosignal, to at least one group according to an occupant detection result and controlling the direction in which each antenna group resulting from the distribution faces; a step of receiving, from the vehicle, vehicular information that includes driving information associated with driving of the vehicle, and posture information associated with the vehicle's posture; a step of detecting the vehicle's vibration, inclination, or movement based on the received vehicular information; a step of modulating at least one of the signal characteristics associated with the detection sensitivity of the occupant's biosignal based on the vehicle's detected movement; a step of sending out the modulated detection signal in the direction in which each antenna group faces; a step of receiving the detection signal reflected from each occupant's body; and a step of analyzing the received detection signal, analyzing each occupant's biosignal, and monitoring each occupant's body state based on the result of the analysis.

In an embodiment, in the method, the signal characteristics may include at least one of the following: the number of unit signals constituting one frame of the detection signal, the bandwidth of the unit signal, the period of the detection signal to be sent out, or the amplitude of the detection signal.

In an embodiment, in the method, the step of receiving the detection signal may include: a step of filtering the received detection signal through a first filter with a range of frequency bands that are adjusted to be allowed to pass through, based on a vehicular state including at least one of the following: the vehicle's vibration, inclination, or movement, each of which is detected; a step of amplifying the detection signal passing through the first filter, based on an amplification gain that varies according to the vehicular state; and a step of filtering the received detection signal through a second filter with a range of frequency bands that are allowed to pass through, based on the vehicular state, and the first filter may be a low-pass filter, and the second filter may be a band-pass filter.

In an embodiment, in the method, the step of distributing the plurality of antennas to at least one group and controlling the direction in which each antenna group resulting from the distribution faces may include: a step of determining each occupant's posture from the occupant detection information; and a step of distributing a varying number of antennas corresponding to each occupant based on each occupant's determined posture.

In an embodiment, in the method, each occupant's posture may be determined based on a distance between each occupant's shoulders that are detected from an image of the occupant within the cabin, which is included in the occupant detection information.

In an embodiment, in the method, the detection signal may be a radar signal or a LIDAR signal.

Advantageous Effects of Invention

The effects of the biosignal detection device for the occupant within the cabin and the method of controlling the biosignal detection device according to the present disclosure are described as follows.

According to at least one of the embodiments of the present disclosure, the detection signal robust against the vibration and inclination due to a driven state of the vehicle is generated by modulating at least one of the following: the amplitude or transmission waveform of a non-contact sensor for detecting the occupant's biosignal, each of which reflects the driven state of the vehicle. Consequently, the disturbance of the detection signal due to the driven state of the vehicle can be suppressed. Accordingly, regardless of the driven state of the vehicle, the occupant's biosignal can be detected. Consequently, the occupant's biosignal can be detected in a more precise and stable manner. This leads to achieving the effect of monitoring the occupant's state.

In addition, according to at least one of the embodiments of the present disclosure, antennas that send out and receive the detection signal are distributed based on the number and locations of the occupants riding in the vehicle and the result of detecting each occupant's posture. Moreover, the directions in which the antennas face are controlled. This leads to achieving the effect of detecting the occupant's biosignal in a more precise and stable manner and thus monitoring the occupant's state.

In addition, according to at least one of the embodiments of the present disclosure, when reflection waves, which result from the detection signal being reflected, are received from the occupant's body, the received reflection waves are differently preprocessed based on the driven state of the vehicle. This leads to achieving the effect of detecting the occupant's biosignal in a more precise manner in response to the driven state of the vehicle.

MODE FOR THE INVENTION

It should be noted that the technical terms used in this specification are only used to describe specific embodiments and are not intended to limit the present disclosure. A singular representation used herein may include a plural representation unless it represents a definitely different meaning from the context. In general, a suffix such as "module" and "unit" may be used to refer to elements or components. Use of such a suffix herein is merely intended to facilitate description of the specification, and the suffix itself is not intended to give any special meaning or function.

In this application, the terms "comprising" and "including" should not be construed to necessarily include all of the elements or steps disclosed herein, and should be construed not to include some of the elements or steps thereof, or should be construed to further include additional elements or steps.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. It should also be understood that each of embodiments described below and combinations of those embodiments are all changes, equivalents, or substitutes which can belong to the idea and scope of the present disclosure.

Figure 1:
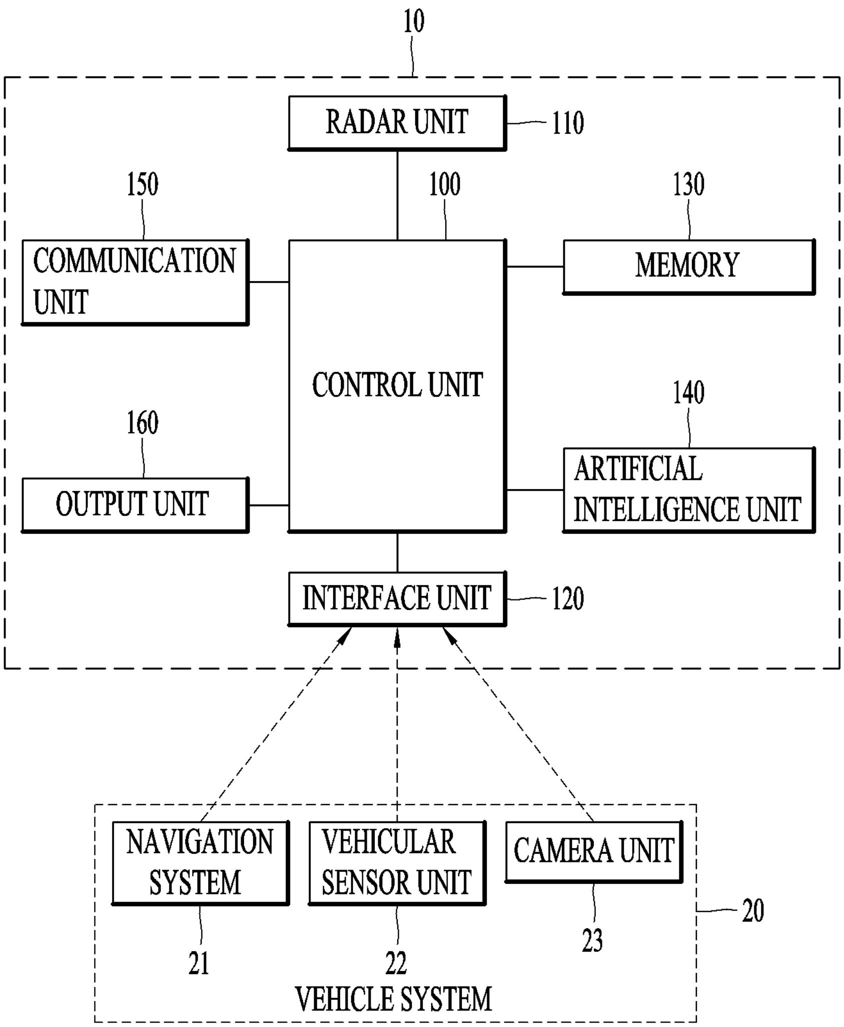
FIG. 1 is a block diagram illustrating a configuration of a biosignal detection device according to an embodiment of the present disclosure that detects a biosignal of an occupant within a cabin.

FIG. 1 is a block diagram illustrating a configuration of a biosignal detection device 10 according to an embodiment of the present disclosure that detects a biosignal of an occupant within a cabin.

With reference to FIG. 1, the biosignal detection device 10 according to the embodiment of the present disclosure is described. The biosignal detection device 10, which is configured to be connected to a vehicle system 20, may be a device arranged in a space within a vehicle, in which a vehicular occupant rides, that is, in the cabin of the vehicle. Examples of the occupant include a driver of the vehicle and all passengers who ride along with the driver. The cabin may refer to the entire space within the vehicle, where the driver's seat and a passenger seat next to the driver's seat are installed and where a person can ride.

In this manner, the biosignal detection device 10 according to the embodiment of the present disclosure, which is designed to be arranged within the cabin of a vehicle, may be connected to the vehicle system 20 that manages the vehicle. To this end, the biosignal detection device 10 may include an interface unit 120 that can be connected to the vehicle system 20 and, through the interface unit 120, may receive pieces of vehicular information, which are provided from the vehicle system 20.

The pieces of vehicular information, which are provided from the vehicle system 20, may be those detected from various vehicular components that constitute the vehicle.

For example, the vehicular component that provides the vehicular information to the biosignal detection device 10 according to the embodiment of the present disclosure may be a navigation system 21 that provides navigation information. The navigation information may be one that includes at least one of the following: map information, information about a set destination, path guidance information for setting the destination, information about various objects on a path, lane information, or current vehicular location information.

In addition, the vehicular component that provides the vehicular information to the biosignal detection device 10 according to the embodiment of the present disclosure may be a vehicular sensor unit 22 that senses a vehicular state. The vehicular sensor unit 22 may include various sensors for detecting the vehicular state. For example, the vehicle sensor unit 22 may include a posture sensor (for example, a yaw sensor, a roll sensor, or a pitch sensor), a collision sensor, a wheel sensor, a speed sensor, an inclination sensor, a weight detection sensor, a heading sensor, a gyro sensor, a position module, a vehicle forward/backward sensor, a battery sensor, a fuel sensor, a tire sensor, a steering sensor for detecting steering wheel rotation, a vehicle interior temperature sensor, a vehicle interior humidity sensor, an ultrasonic sensor, an illumination sensor, an accelerator pedal position sensor, a brake pedal position sensor, and similar sensors.

Based on the result of sensing by at least one provided sensor, the vehicular sensor unit 22 may acquire the following information: vehicle posture information, vehicle collision information, vehicle direction information, vehicle location information (GPS information), vehicle angle information, vehicle speed information, vehicle acceleration information, vehicle inclination information, vehicle forward/backward information, battery information, fuel information, tire information, vehicle lamp information, vehicle interior temperature information, vehicle interior humidity information, and information about steering wheel rotation angle, vehicle exterior illuminance, and the like. At the request of the biosignal detection device 10, at least one of the acquired pieces of information may be provided to the biosignal detection device 10 through the interface unit 120.

In addition, the vehicular component that provides the vehicular information to the biosignal detection device 10 according to the embodiment of the present disclosure may be a camera unit 23 that includes at least one camera. The at least one camera included in the camera unit 23, which is designed to acquire an image of the interior of the cabin of the vehicle, may be one for detecting an occupant within the cabin.

The vehicle system 20 may be an Electronic Control Unit (ECU) that controls the overall operation of each of the vehicular components of the vehicle. In addition, the interface unit 120 may be connected to a vehicular interface unit 120 that serves as a pathway to various types of external devices connected to the vehicle, or may also be the vehicular interface unit 120.

The biosignal detection device 10 according to the embodiment of the present disclosure, which is connected to the vehicle system 20 and is arranged within the cabin of the vehicle, may be configured to include a control unit 100, a radar unit 110, and a memory 130 in addition to the interface unit 120. The radar unit 110 and the memory 130 are connected to the control unit 100. In addition, the biosignal detection device 10 may be configured to include an artificial intelligence unit 140. The biosignal detection device 10 may also be configured to include an output unit 160 and a communication unit 150. Constituent elements illustrated in FIG. 1 are not essential in realizing the biosignal detection device 10. Alternatively, the biosignal detection device 10 described in the present disclosure may include one or more constituent elements in addition to those enumerated above and may omit one or more of these constituent elements.

More specifically, the radar unit 110 may be configured to include a transmission antenna for sending out a radar signal for detecting the biosignal of the occupant within the cabin, and a reception antenna for receiving a radar signal reflected from the occupant's body. Under the control of the control unit 100, the radar unit 110 may change the facing directions of the transmission antenna and the reception antenna in such a manner that the transmission antenna and the reception antenna face in a specific direction. Furthermore, under the control of the control unit 100, the radar unit 110 may appropriately distribute the transmission antennas and the reception antennas based on the result of occupant detection within the cabin, thereby maximizing the effect of detecting the occupant's biosignal using the radar signal.

In addition, under the control of the control unit 100, the radar unit 110 may perform preprocessing on the radar signal reflected from the occupant's body before either modulating the radar signal to be sent out or monitoring the biosignal. To this end, the radar unit 110 may include at least one constituent element for modulating the radar signal and at least one constituent for performing preprocessing on the received radar signal.

The configuration of the radar unit 110, which includes the constituent elements for modulating the radar signal to be sent out and the constituent element for preprocessing the received radar signal, both under the control of the control unit 100, will be described in more detail below with reference to FIG. 2.

Stored in the memory 130 may be data that support the function of the biosignal detection device 10 and the operation of the control unit 100. Stored in the memory 130 may be many applications or application programs, which are executed in the biosignal detection device 10, and data and commands for the operation of the biosignal detection device 10.

For example, stored in the memory 130 may also be data that are input and output for the operation of the control unit 100. In addition, stored in the memory 130 may be various pieces of vehicular information that include vehicular driving information and vehicular state information which are received through the interface unit 120. Furthermore, stored in the memory 130 may be commands and data necessary for the control unit 100 to process the stored pieces of vehicular information and to modulate the radar signal and preprocess the received radar signal based on the pieces of vehicular information.

At least one of these application programs may be downloaded from an external server through wireless communication. In addition, at least one of these application programs may be preinstalled on the biosignal detection device 10 before the time of shipment from the factory. The application program may be stored in the memory 130 and be installed on the biosignal detection device 10. The control unit 100 may execute the application program to perform the operation of the biosignal detection device 10.

The control unit 100 may control each connected constituent element and may control the overall operation of the biosignal detection device 10.

For example, by controlling the interface unit 120, the control unit 100 may be provided with the vehicular information, which includes the vehicular driving information and the vehicular state information, from the vehicle system 20.

For example, the control unit 120 may be provided with vehicular driving information associated with driving of the vehicle, such as vehicular acceleration information, vehicular speed information, vehicular forward or backward information, rotation-direction information indicating a vehicular rotation direction, and brake information, through the navigation system 21 provided in the vehicle system 20 or through a travel system of the vehicle. In addition, the control unit 120 may be provided with the vehicular state information associated with the vehicle's posture, such as a posture and an inclination in pitch, roll, and yaw directions, through the vehicular sensor unit 22 included in the vehicle system 20. In addition, the control unit may be provided with occupant detection information, which is obtained by detecting the number of occupants riding within the cabin and the locations and postures of the occupants, through the camera unit 23 or the vehicular sensor unit 22 that is included in the vehicle system 20.

Then, based on the detected vehicular driving information and state information, the control unit 100 may determine at least one of the following: the vehicle's vibration, inclination, or movement such as rotation, acceleration, deceleration, or braking. Then, the control unit 100 may modulate the radar signal for detecting the biosignal signal of the occupant within the cabin, based on at least one of the following: the vehicle's vibration, inclination, or movement, each of which are determined. For example, by controlling the radar unit 110, the control unit 100 may modulate an amplitude of the radar signal to be sent out or may modulate the number of basic radar signals that constitute one frame. As an example, in a case where the basic radar signal is a radar signal, that is, a chirp that has a wavelength whose frequency varies over time, the control unit 100 may control the radar unit in such a manner that the number of chirps constituting the frame varies. To this end, the control unit 100 may change the time (Ramp End Time) at which each chirp ends. In addition, the control unit 100 may also change the bandwidth between a maximum frequency of each chirp and a minimum frequency thereof.

Alternatively, by controlling the radar unit 110, the control unit 100 may change the idle time between frames and TX Start Time and then may send out the radar signal. Alternatively, by changing Analog-Digital Converting (ADC) Start Time (ADC Start Time), the control unit may also change the time for sending out the radar signal.

In addition, in a case where the radar signal reflected from the occupant within the cabin is received, the control unit 100 may also preprocess the received radar signal according to the vehicular driving information and state information before detecting the biosignal signal. For example, the control unit 100 may control at least one filtering unit, which filters out noise from the received radar signal, according to the vehicular driving information and state information, thereby increasing or decreasing the level of filtering. In this case, increasing the level of filtering may refer to narrowing a frequency range that is allowed to pass through the filtering unit. Conversely, decreasing the level of filtering may refer to broadening a frequency range that is allowed to pass through the filtering unit. In addition, the control unit 100 may also change the amplification gain of the received radar signal in a manner that varies according to the vehicular driving information and state information.

In this manner, the control unit 100 may send out a radar signal that is robust against vibration, inclination, vehicular movement, and similar motions, which are caused by a driven state of the vehicle, by modulating the radar signal to be sent out or the time for sending out the radar signal. In addition, the control unit 100 may receive a radar reflection signal robust against the vehicle's vibration, inclination, movement such as rotation, acceleration, deceleration, or braking, and the like by controlling the process of preprocessing of the radar signal, which is reflected from the occupant's body and received, according to the driven state of the vehicle. Therefore, even in a case where intense vibration or noticeable tilting of the occupants' bodies occurs due to the driven state of the vehicle, bioinformation about the occupants' body states can be acquired regardless of the vehicle's vibration, tilting, or movement. Therefore, each of the occupants' body states based on the acquired bioinformation can be detected more precisely.

The control unit 100 may control the radar unit 110 based on the number and locations of detected occupants and each occupant's posture in such a manner as to distribute a varying number of antennas. For example, based on the number of the detected occupants, the control unit 100 may distribute the transmission antennas that send out the radar signal, and the reception antennas that receive the radar signal reflected from the occupant's body. Then, based on the result of detecting the locations of the occupants, the control unit 100 may control the distributed antennas in such a manner as to face toward the detected location of each occupant.

At this point, the number and locations of the occupants may be provided from the vehicle system 20. For example, at the request of the control unit 100, the vehicle system 20 detects the occupants within the cabin based on the result of the sensing by the vehicular sensor unit 22 or the image acquired by the camera unit 23.

As an example, the vehicular sensor unit 22 may depend on a weight sensor or a temperature sensor arranged in each seat within the cabin to detect whether or not an occupant occupies each seat. Then, the number and locations of the occupants can be detected based on the occupied seats. In this case, the control unit 100 may drive an antenna unit 200 based on the number and locations of occupied seats, which are detected from the vehicular sensor unit 22. Thus, the control unit 100 may distribute the transmission antennas and the reception antennas and determine the direction in which each antenna faces.

In addition, the control unit 100 may acquire an image of the cabin's interior, which is acquired through at least one camera included in the camera unit 23. Then, the number and locations of the occupants riding within the cabin can be detected from images of the occupants, which are included in the acquired image. In this case, the control unit 100 may detect areas, including facial images, from the acquired image and, based on the number and locations of the detected areas, may also detect the number and locations of the occupants.

The control unit 100 may also, of course, detect the number and locations of the occupants within the cabin using the result of the sensing by the vehicular sensor unit 22 and the image acquired from the camera unit 23 in a complementary manner.

For example, the control unit 100 may first detect an occupied state of the seat based on the result of the sensing by the vehicular sensor unit 22. Then, the control unit 100 may also detect each occupant from the image acquired by the camera 23, with the location of each of the occupied seats as the center. In this case, in a case where the location of the occupied seat is the same as the location of the occupant, which is detected from the image acquired from the camera, the control unit 100 may detect that an occupant sits on the seat in question. In this case, the number and locations of the occupants can be detected in a more precise and quick manner.

Conversely, the number of locations of the occupants within the cabin may also be determined by adding the occupant detection result acquired from the occupied state of the seat to the occupant detection result acquired from the image captured by the camera. In this case, an occupant who is hidden from view behind the front seat and thus is detected only from the image captured by the camera may also be detected according to the result of occupying the seat. The reason an occupant is hidden from view behind the front seat could be that he/she is of short height (in the case of a child or infant), has a reclined posture, or is in a similar position. Therefore, it may be possible to detect the number and locations of the occupants within the cabin in a more precise manner.

In a case where the image acquired from the camera is used to detect an occupant, the control unit 100 may also acquire posture information of the occupant from the acquired image. For example, the control unit 100 may compute a distance between the shoulders of each of the occupants included in the acquired image and may estimate the occupant's current posture based on the computed distance between the shoulders. Then, in a case where the occupant's posture is estimated, the number of the transmission antennas or the number of the reception antennas, reflecting the estimated posture, that face toward the occupant may also be changed. That is, in a case where the occupant's posture is twisted, an area from which an antenna signal is reflected may decrease, resulting in reduced sensitivity of the reflected antenna signal. In this case, in order to compensate for a reduction in the sensitivity of the antenna signal due to the occupant's posture, the control unit 100 may also control the radar unit 110 in such a manner that more transmission antennas or reception antennas face toward the occupant.

In a case where an occupant is detected through the camera, the control unit 100 may also control the radar unit 110 in such a manner that the directions in which the transmission antenna and the reception antenna face are changed, by determining a reference point from each occupant's image and automatically tracking the determined reference point. As an example, the control unit 100 may determine each occupant's face or chest as the reference point from the image acquired through the camera and may control the radar unit 110 in such a manner as to face toward and track the reference point. In this case, when an occupant changes his/her posture or moves his/her location, the facing directions of the transmission antenna and the reception antenna, which are distributed to the occupant, may be changed according to the occupant's new posture or new location. In this case, when the camera unit 23 includes a plurality of cameras, the cameras may also be used to track changes in different occupants' postures or different occupants' location movements.

The biosignal detection device 10 according to the embodiment of the present invention may also be configured to include the artificial intelligence unit 140. The artificial intelligence unit 140 serves to process pieces of information based on artificial intelligence technology and may include one or more modules that perform at least one of the following: information learning, information inference, information perception, or natural language processing.

Using machine learning technology, the artificial intelligence unit 140 may perform at least one of the following: learning, inferring, or processing vast amounts of information (Big Data), such as information stored on a preset external server and information stored in an external storage that is capable of communicating with the external server.

The learning here may be performed through the machine learning technology. The machine learning technology is a technology that collects and learns vast amounts of information based on at least one algorithm and determines and predicts information on the basis of the learned information. The information learning refers to the process of recognizing features, rules, determination references, and other relevant factors of pieces of information, quantifying a relationship between the pieces of information, and predicting new data using a quantified pattern.

The algorithms used by the machine learning technology may be statistics-based algorithms. Examples of the algorithms may include: decision trees, which use tree structure forms as predictive models; neural networks, which mimic the structures and functions of biological neural networks; genetic programming based on biological evolutionary algorithms; clustering, which distributes observed examples to subsets called clusters; and the Montercarlo method, which computes function values as probabilities through randomly extracted random numbers, among others.

Deep learning technology, as a field of the machine learning technology, is a technology that uses artificial neural network algorithms to perform at least one of the following: learning, determining, or processing information. The artificial neural network may have a structure in which a layer (hidden layer) and a layer are connected to each other and data is transferred between the layers. This deep learning technology may enable the learning of vast amounts of information through an artificial neural network using a central processing unit (CPU) optimized for parallel computation.

In the present specification, the artificial intelligence unit 140 and the control unit 100 may also be understood as the same constituent element. In this case, the function performed by the control unit 100, which is described in the present disclosure, may be expressed as being performed by the artificial intelligence unit 140. Additionally, the control unit 100 may be referred to as the artificial intelligence unit 140. Conversely, the artificial intelligence unit 140 may be permissibly referred to as the control unit 100.

Otherwise, in the present specification, the artificial intelligence unit 140 and the control unit 100 may be understood as separate constituent elements. In this case, the artificial intelligence unit 140 and the control unit 100 may perform various controls, associated with occupant biosignal detection and monitoring, by exchanging data with each other. Based on the result derived by the artificial intelligence unit 140, the control unit 100 may perform at least one of the functions capable of being performed by the biosignal detection device 10 or may control at least one of the constituent elements of the biosignal detection device 10. Moreover, the artificial intelligence unit 140 may operate under the control of the control unit 100.

In a case where the vehicle's scheduled travel path is set, the artificial intelligence unit 140 may detect characteristics of the path for the vehicle to pass along based on this set path. As an example, the artificial intelligence unit 140 may detect at least one of the following as the characteristics of the path: a road inclination angle, a road curve angle, or a state of road pavement, each of which is for at least one section of the scheduled travel path. In addition, the artificial intelligence unit 140 may detect a congestion state of the road based on traffic information or may detect weather information for the vicinity of the road from a preset server (for example, a weather server). Then, based on at least one of the following: the detected path characteristic information, road congestion state, or weather information, the artificial intelligence unit 140 may predict the vehicular driving information, such as vehicular speed information, acceleration information, and brake information, which will occur in the future, and may predict the vehicular state information, such as the vehicle's posture and inclination.

Then, the control unit 100 may detect whether or not the vehicle enters at least one section with the predicted path characteristics. Then, in a case where the vehicle enters the at least one section, based on the vehicular driving information and the vehicular state information, which are predicted through the artificial intelligence unit 140, the control unit 100 may predict at least one of the following: the vehicle's vibration, inclination, or movement. Then, based on the vehicle's vibration, inclination, and movement, which are predicted, the control unit 100 may preset at least one of modulation values of the radar signal. For example, the modulation values are an amplitude modulation value, the number of chirps per frame, Ramp End Time of each chirp, and a bandwidth of each chirp. Alternatively, the control unit 100 may preset at least one of the following: the inter-frame idle time, frame TX Start Time, or ADC Start Time. In addition, the control unit 100 may also preset a cutoff frequency value or an amplification gain for filtering a radar reception signal. These preset values may be activated in a case where the vehicle enters a path section corresponding to the preset values. The control unit 100 may control the radar unit 110 in such a manner that the radar signal to be sent out varies in modulation or sending-out timing according to the activated values. Alternatively, the control unit 100 may control the radar unit 110 in such a manner that the radar signal to be received varies in filtering frequency or amplification gain.

In this case, based on the vehicular driving information and the vehicular state information, which are predicted through the artificial intelligence unit 140, the control unit 100 may also, of course, predict at least one of the following: the vehicle's vibration, inclination, or movement. In this case, based on the vehicular driving information and the vehicular state information, which are predicted, the artificial intelligence unit 140 may also predict at least one of the following: the vehicle's vibration, inclination, or movement. Then, in a case where the vehicle enters a designated section, the control unit 100 may control the radar unit 110 by immediately applying at least one of the following: the vehicle's vibration, inclination, or movement, each of which is predicted through the artificial intelligence unit 140. Therefore, the time taken to determine a state of the vehicle and to reflect the determined state in the preprocessing of the radar signal that is modulated or reflected and received may be further shortened.

The biosignal detection device 10 according to the embodiment of the present disclosure may further include the communication unit 150. The communication unit 150 includes at least one communication module that enables wireless connection between the biosignal detection device 10 and the vehicle system 20 or at least one peripheral device located within the vehicle, or between the biosignal detection device 10 and a preset external server.

For example, the biosignal detection device 10 may be connected to the vehicle system 20 through the communication unit 150 instead of the interface unit 120 and may also receive pieces of vehicular information, provided from the vehicle system 20, through the communication unit 150. Alternatively, the biosignal detection device 10 may also be connected to at least one server, for example, a server that provides traffic information, a server that provides path or terrain information, or a server that provides weather information, to predict the path characteristics of the vehicle's future path through the communication unit 150. Alternatively, the biosignal detection device 10 may transmit an emergency relief information request to an external preset server or may also be connected to a server in a medical institution and make a request for a medical service for the occupant within the cabin.

Alternatively, the biosignal detection device 10 may be connected to mobile terminals carried by the occupants within the cabin through the communication unit 150 and may provide guide information, which results from detecting the bioinformation of the occupants, through the mobile terminals.

In addition, the biosignal detection device 10 according to the embodiment of the present disclosure may also further include the output unit 160 which is capable of outputting information associated with the occupant's body state that is determined according to the occupant's detected biosignal. In this case, the output unit 160 may include a display that is capable of outputting a video signal or an audio output unit that is capable of outputting an audio signal. In this case, the control unit 100 may provide a body state determination result, which varies according to the detected biosignal, to the occupant within the cabin through the output unit 160. Additionally, the control unit 100 may recommend rest if necessary and may output guide information associated with medical action.

Figure 2:
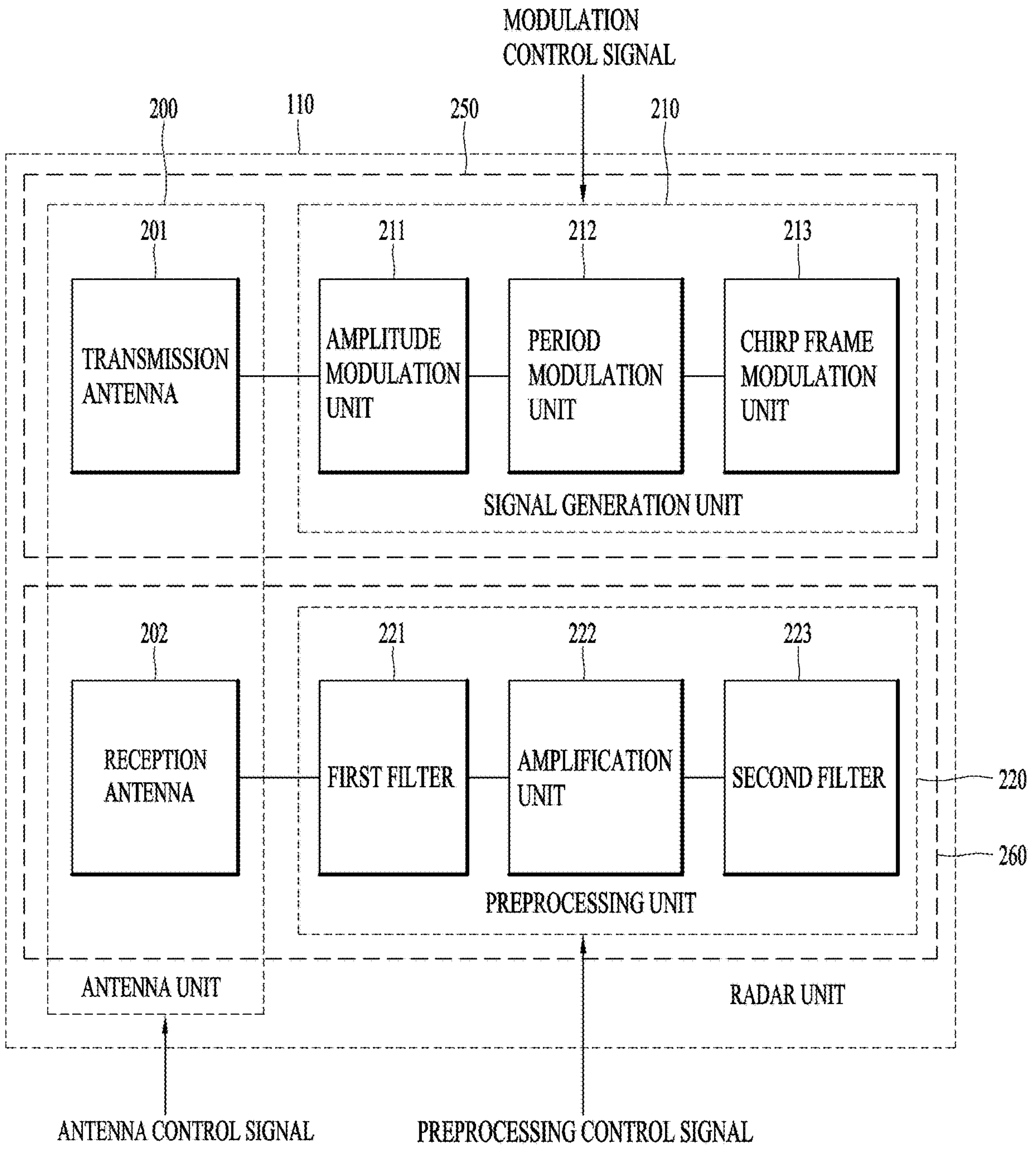
FIG. 2 is a block diagram illustrating in more detail the configuration of the radar unit, which is one of the constituent elements of the biosignal detection device according to the embodiment of the present disclosure.

FIG. 2 is a block diagram illustrating in more detail the configuration of the radar unit 110, which is one of the constituent elements of the biosignal detection device 10 according to the embodiment of the present disclosure.

With reference to FIG. 2, the radar unit 110 according to the embodiment of the present disclosure may be configured to include the antenna unit 200, a signal generation unit 210, and a preprocessing unit 220. The antenna unit 200 includes a plurality of antennas. The signal generation unit 210 generates the radar signal to be sent out. The preprocessing unit 220 performs preprocessing on the radar signal that is reflected from the occupant's body and received. Constituent elements illustrated in FIG. 2 are not necessarily required for the realization of the radar unit 110. Therefore, the radar unit 110 described in the present specification may include one or more constituent elements in addition to those described below or may omit one or more of these constituent elements.

First, the antenna unit 200 is described. The antenna unit 200 may be configured to include a plurality of transmission antennas 201 and a plurality of reception antennas 202. Then, the plurality of transmission antennas 201 and the plurality of signal generation units 210 may constitute a radar signal sending-out unit 210 that sends out the radar signal for detecting the biosignal of the occupant within the cabin. Then, the plurality of reception antennas 202 and the preprocessing unit 220 may constitute a radar signal reception unit that receives the radar signal which is reflected from the occupant within the cabin.

The antenna unit 200 here may group the plurality of transmission antennas or the plurality of reception antennas into a plurality of different groups based on an antenna control signal applied from the control unit 100. Then, the antenna unit 200 may change the facing direction of the antenna in each group according to the antenna control signal in such a manner that the plurality of antenna groups face toward different occupants, respectively. As an example, the plurality of transmission antennas or the plurality of reception antennas may be grouped into a plurality of groups according to the number of the detected occupants, which varies according to the occupant detection result. Then, the corresponding occupant may be determined on a per-antenna group basis. Then, the directions in which at least one antenna, which constitutes each group, face may be determined according to the location of each corresponding occupant.

The antennas that constitute each group may vary in number among the groups. In this case, the number of the transmission antennas or the reception antennas that face toward the corresponding occupant may vary based on the corresponding occupant's location or posture. For example, in a case where a distance (a distance from the radar unit 110) is greater or where the occupant's posture is not proper, a greater number of the transmission antennas or the reception antennas may be distributed than in a case where the distance is short or where the occupant sits in a proper posture.

The antennas included in the antenna unit 200 may be antennas capable of being used for transmission, reception, or both. In this case, through the antenna control signal, the control unit 100 may distribute antennas used for transmission and antennas used for reception in a manner that differs in number. In this case, the transmission antennas and the reception antennas in each antenna group, which are distributed in such a manner as to correspond to each occupant, may also vary in number.

Connected to the transmission antenna 201 may be the signal generation unit 210 that generates the radar signal to be sent out by the transmission antenna 201. The signal generation unit 210 may include constituent elements for modulating the basic radar signal, which is generated by an oscillator (not illustrated) that oscillates the radar signal, according to a modulation control signal that is applied from the control unit 100.

As an example, the signal generation unit 210 may include: a chirp frame modulation unit 213 for modulating the number of the basic radar signals included in one frame, for example, chirp signals included in one frame; a period modulation unit 212 for modulating the period of the radar signal; and an amplitude modulation unit 211 for modulating the amplitude of the radar signal. In addition, although not illustrated, the signal generation unit 210 may also include a bandwidth modulation unit that modulates a difference between the maximum and minimum frequencies of the chirp signal, that is, a bandwidth.

At this point, the chirp frame modulation unit 213 may increase or decrease the number of the chirp signals included in one frame, by modulating Ramp End Time of each chirp signal included in the frame. In addition, the period modulation unit 212 may change a sending-out period of the radar signal by changing the idle time between frames, TX Start Time, the analog-digital converting start time (ADC Start Time). In addition, the amplitude modulation unit 211 may increase or decrease by the amplitude of the radar signal to be sent out, by increasing or decreasing the amplitude of the chirp signal.

Then, the control unit 100 may apply to the signal generation unit 210 the modulation control signal that varies according to at least one of the following: the vehicular driving information or vehicular state information, each of which is detected from the vehicle. Thus, the control unit 100 may control at least one of the following: the chirp frame modulation unit 213, the period modulation unit 212, or the amplitude modulation unit 211. Accordingly, the control unit 100 may modulate at least one of the following: the number of the chirp signals included in one frame, the period or amplitude of the radar signal, or the bandwidth of the chirp signal, based on at least one of the following: the vehicular driving information or the vehicular state information. Therefore, in order to detect each occupant's biosignal, the radar signal, which is modulated according to at least one of the following: the vehicular driving information or the vehicular state information, may be sent out from each transmission antenna 201 to the occupant located toward the direction in which each transmission antenna 201 faces.

Connected to the reception antenna 202 may be the preprocessing unit 220 for preprocessing the radar signals received by the reception antenna 202. The preprocessing unit 220 may include constituent elements for preprocessing the radar signal reflected from the occupant's body according to a control signal (a preprocessing control signal) applied from the control unit 100, before detecting the biosignal that varies according to the received radar signal.

For example, the preprocessing unit 220 may be configured to include: a first filter 221 for primarily removing noise; an amplification unit 222 that amplifies the radar signal, from which the noise is removed by the first filter 221, according to a preset amplification gain; and a second filter 223 that extracts only signals in a bandwidth of interest from the amplified radar signal. The first filter 221 here may be a low-pass filter (LPF) for removing high-frequency noise, and the second filter 223 may a band-pass filter (BPF) that allows only a frequency signal in an allocated band to pass through.

The control unit 100 may apply the preprocessing control signal to the preprocessing unit 220 the preprocessing control signal that varies according to at least one of the following: the vehicular driving information or the vehicular state information, each of which is detected from the vehicle. Thus, the control unit 100 may control at least one of the following: the first filter 221, the amplification unit 222, or the second filter 223.

As an example, the control unit 100 may apply the preprocessing control signal to the preprocessing unit 220. Thus, the control unit 100 may expand a frequency band, which is allowed to pass through, by increasing a cut-off frequency of the first filter 221 or may narrow the frequency, which is allowed to pass through, by decreasing the cut-off frequency. Alternatively, the control unit 100 may change the amplification gain of the amplification unit 222. The control unit 100 may increase a lower cut-off frequency of the second filter 223 and decrease an upper cut-off frequency. Conversely, the control unit 100 may decrease the upper cut-off frequency and increase the lower cut-off frequency. That is, the control unit 100 may expand the frequency band that is allowed to pass through the second filter 223 or may narrow the frequency band that is allowed to pass through the second filter 223.

In this case, when at least one of the following is at or below a predetermined level: the vehicle's vibration, inclination, or movement, each of which is determined according to the vehicular driving information or the vehicular state information, the control unit 100 may determine that a state where the slight disturbance of the radar signal occurs is reached. Therefore, the control unit 100 may increase the cut-off frequency of the first filter 221 or may increase the gain of the amplification unit 222 in order to detect a more accurate biosignal. In addition, the control unit 100 may increase the size of a frequency band that is allowed to pass through the second filter 223, by increasing the upper cut-off frequency of the second filter 223 or decreasing the lower cut-off frequency. Therefore, the radar signal is detectable in response to a subtle change in the biosignal, and thus more precise monitoring of the occupant's body state is made possible.

Conversely, the control unit 100 may determine that a state where the severe disturbance of the radar signal occurs is entered, in a case where at least one of the following exceeds a predetermined level: the vehicle's vibration, inclination, or movement, each of which is determined according to the vehicular driving information or the vehicular state information. Therefore, in order to decrease the impact of the disturbance, the control unit 100 may decrease the cut-off frequency of the first filter 221 or may decrease the gain of the amplification unit 222. In addition, the control unit 100 may decrease the size of a frequency band that is allowed to pass through the second filter 223, by decreasing the upper cut-off frequency of the second filter 223 or increasing the lower cut-off frequency thereof. Therefore, the detectable bandwidth is decreased, thereby facilitating the detection of the radar signal corresponding to the biosignal. Thus, even in a case where the severe disturbance occurs due to the driving of the vehicle, accurate monitoring of the occupant's body state may be made possible.

The configuration where the radar signal is sent out and received as a signal for detecting the occupant's bioinformation and where the biosignal detection device 10 according to the embodiment of the present disclosure accordingly includes the radar unit 110 is described above as an example, but the present disclosure is, of course, not limited to this configuration.

As an example, the radar unit 110 may also be a LiDAR unit that sends out and receives a LIDAR signal, instead of the radar signal.

In this case, under the control of the control unit 100, the LiDAR unit may modulate the LiDAR signal to be sent out, in the same manner as the radar unit 110 operates or similarly to how the radar unit 110 operates, based on the vehicular information provided from the vehicle system 20. In addition, before monitoring the biosignal, under the control of the control unit 100, the LiDAR unit may also preprocess the LiDAR signal that is reflected from the occupant's body within the cabin and received, based on the vehicular information.

Therefore, the configuration in which the signal for detecting the occupant's bioinformation is sent out in the biosignal detection device 10 according to the embodiment of the present disclosure is not limited to the radar unit 110. Of course, the LiDAR unit may also be used instead of the radar unit 110. However, on the assumption that the signal for detecting the occupant's bioinformation is the radar signal, a case where the radar unit 110 is accordingly provided is described below as an example.

The configuration of the biosignal detection device according to the embodiment of the present disclosure is described in detail above.

Embodiments associated with a control method that is capable of being realized in the biosignal detection device 10 for the occupant within the cabin, configured as described above, are described below with reference to the accompanying drawings. It would be apparent to a person of ordinary skill in the art that the present disclosure may be embodied in a different specific form within the range that does not depart from the nature and essential features of the present disclosure.

Figure 3:
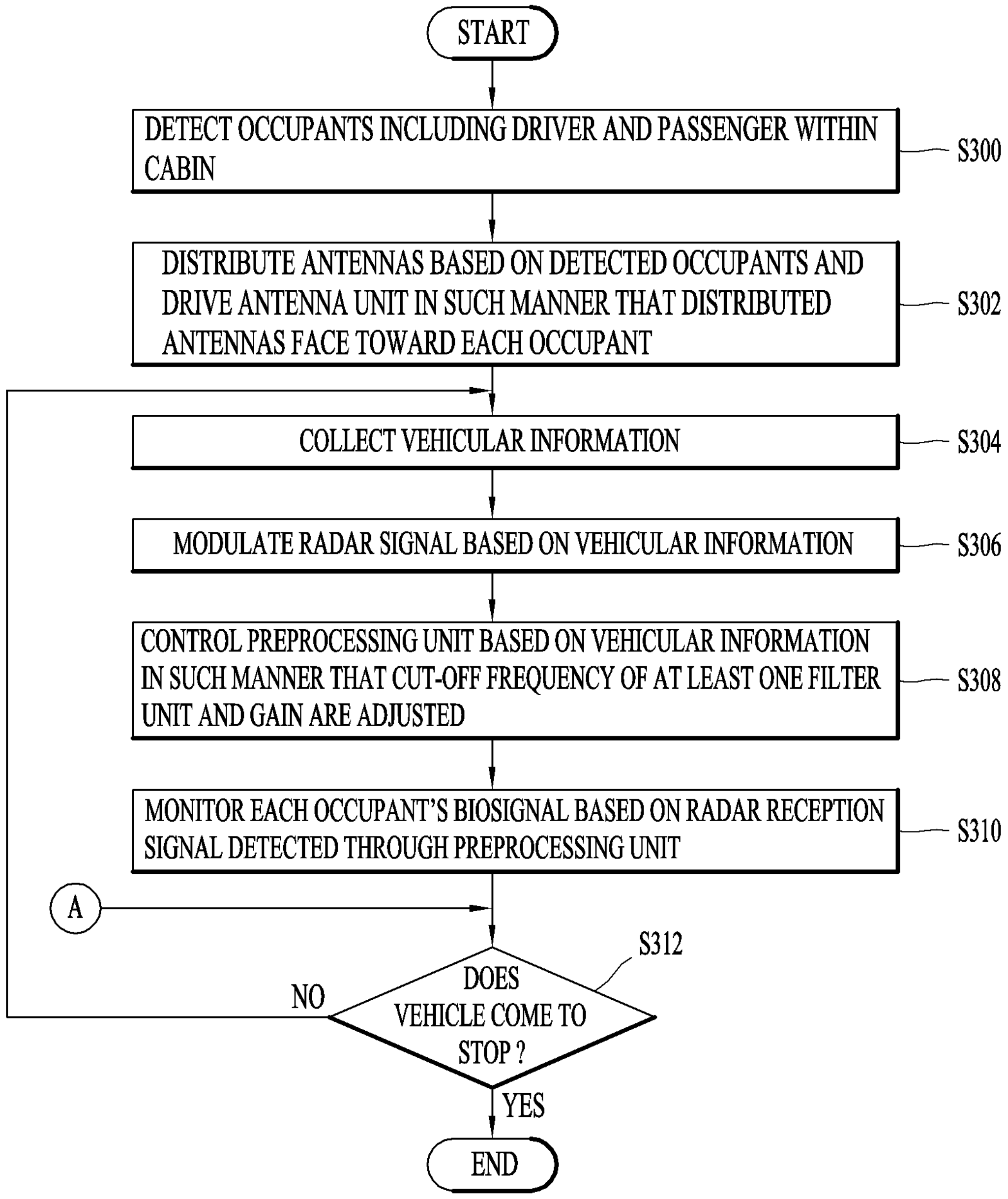
FIG. 3 is a flowchart illustrating operational steps of detecting the occupant's biosignal, which reflects vehicular information detected from a vehicle, in the biosignal detection device according to the embodiment of the present disclosure.
Figure 4:
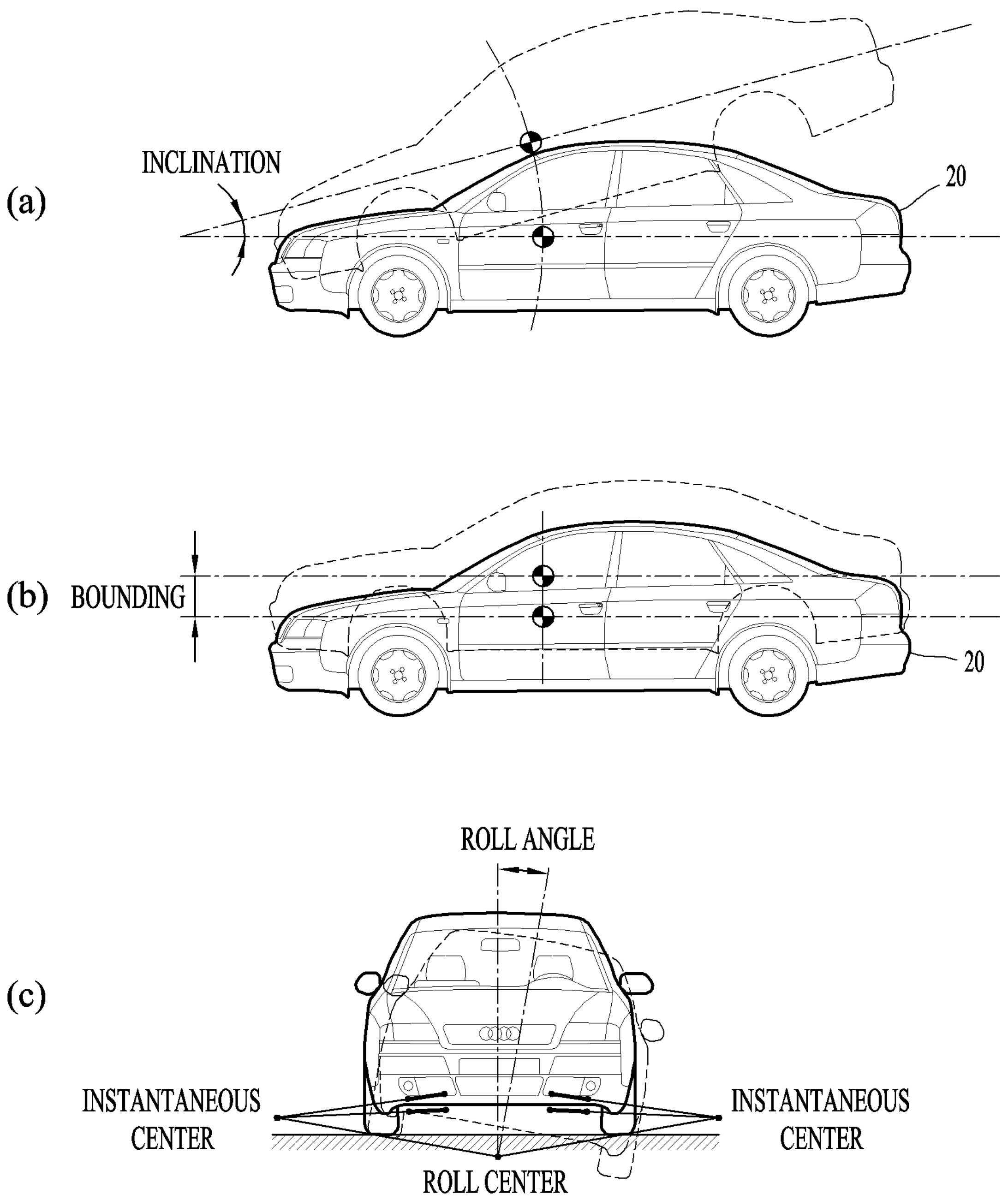
FIG. 4 is a view illustrating examples of the vehicle's vibration and inclination that are included in the vehicular information.

FIG. 3 is a flowchart illustrating operational steps of detecting the occupant's biosignal, which reflects the vehicular information detected from the vehicle, in the biosignal detection device 10 according to the embodiment of the present disclosure. FIG. 4 is a view illustrating examples of the vehicle's vibration and inclination that are included in the vehicular information.

With reference to FIG. 3, when a vehicle starts to drive, the control unit 100 of the biosignal detection device 10 according to the embodiment of the present disclosure may first detect a driver and a passenger, that is, occupants riding within a cabin of a vehicle 2 (S300). At this point, the vehicle starting to drive may refer to a case where the vehicle starts to operate or move.

Then, based on the result of detecting the occupants in Step S300, the transmission antenna and the reception antenna may be distributed to each occupant in an allocated manner, and the antenna unit 200 may be driven in such a manner that the transmission antenna and the reception antenna, which are distributed, face toward the designated occupant.

In Step S300, in order to detect the occupant, the control unit 100 may acquire at least one of the following: occupancy information of a seat within the cabin or a camera image of the cabin's interior, each of which is provided through the vehicle system 20. The number and locations of the occupants riding within the cabin of the vehicle 2 may be detected based on at least one of the following: the occupancy information of the seat or the image of the cabin's interior, each of which is acquired.

Then, the control unit 100 may proceed to Step S302, may group the plurality of transmission antennas and the plurality of reception antennas according to the number of the detected occupants, and may control the antenna unit 200 in such a manner that at least one transmission antenna and at least one reception antenna are allocated to each occupant. The control unit 100 may change the directions, in which antennas in the transmission antenna group and the reception antenna group, which are allocated to each designated occupant, face, to a direction that corresponds to the location of the designated occupant, thereby controlling the antenna unit 200 in such a manner that the antennas face toward the designated occupant.

In a case where the image of the cabin's interior is acquired to detect the occupant, the control unit 100 may acquire the posture information of each occupant from the acquired image of the cabin's interior. In this case, the control unit 100 may distribute the transmission antennas and reception antennas that are allocated to each occupant, based on the acquired posture information of each occupant. Accordingly, more transmission antennas and more reception antennas may also be distributed to a specific occupant, depending on the postures of the detected occupants. Operational steps, in addition to Step S302 of determining the number of the antennas distributed in this manner based on the postures of the detected occupants, are described in more detail below with reference to FIG. 5.

When, through Step S302, based on the number and locations of the occupants, the antennas are distributed and the direction in which each antenna faces is changed, the control unit 100 may collect the vehicular information including the driving information associated with the driving of the vehicle and the state information associated with the vehicular state (S304). The vehicular driving information here may be information associated with the vehicular movements, such as the vehicular acceleration information, the vehicular speed information, the vehicular forward or backward information, the vehicular rotation direction information, and the brake information. In addition, the vehicular state information may be information including vehicular vibration information, vehicular inclination information, and other information that varies according to vehicular posture information in the pitch, roll, and yaw directions.

As an example, the vehicular state information may be information indicating the vehicle's posture as illustrated in FIG. 4. That is, as illustrated in FIG. (a) of FIG. 4, in a case where a vehicle body is inclined with respect to the horizontal surface, the inclination of the vehicle body may be acquired as the vehicular state information. In addition, as illustrated in FIG. (b) of FIG. 4, in a case where the vehicle body experiences bounding, that is, in a case where vertical movement, such as up-and-down vibration, occurs with respect to the ground, the vibration due to the bounding state may be acquired as the vehicular state information. In addition, as illustrated in FIG. (c) of FIG. 4, in a case where the inclination (roll angle) of the vehicle body occurs in the direction vertical to the direction in which the vehicle travels, the inclination in the roll direction and the vibration due to movement around the instantaneous center may be acquired as the vehicular state information.

When the vehicular state information, including the vehicular driving information and the vehicular state information, which are described above, is acquired, the control unit 100 may modulate the radar signal for detecting the occupant's biosignal based on at least one of the following: the vehicle's vibration, inclination, or movement, each of which is determined from the acquired vehicular information (S306).

For example, the control unit 100 may modulate the characteristic of the radar signal in such a manner as to be robust against changes in the vehicle's vibration, inclination, and movement, in a case where at least one of the following exceeds a preset threshold: the vehicle's vibration, inclination, or movement, each of which is determined from the vehicular driving information and the vehicular state information. That is, the influence due to the vehicle's vibration, inclination, and movement may be minimized by modulating the characteristic of the radar signal in such a manner as to reduce sensitivity.

Conversely, the control unit 100 may determine that more precise biosignal detection is possible, in a case where at least one of the following: the vehicle's vibration, inclination, or movement, each of which is determined from the vehicular driving formation and the vehicular state information, is at or below the preset threshold. Therefore, the characteristic of the radar signal may be modulated in such a manner that the sensitivity is further increased. In this case, with the increase in sensitivity, it is possible to detect a subtle change in the radar signal to be detected. Thus, more precise biosignal detection may be enabled.

An operation in Step S306 of modulating the radar signal to be sent out based on at least one of the following: the vehicle's vibration, inclination, or movement, each of which is determined, is described in more detail below with reference to FIG. 8.

Accordingly, the control unit 100 of the biosignal detection device 10 according to the embodiment of the present disclosure may analyze the received radar signal and thus detect the occupant's body state in a case where the radar signal modulated according to the driven state of the vehicle based on at least one of the vehicle's vibration, inclination, or movement is reflected from the occupant's body and received back by the radar unit 110.

Then, of course, before analyzing the occupant's signal based on the received radar signal, the control unit 100 may also perform preprocessing on the received signal based on at least one of the following: the vehicle's vibration, inclination, or movement, each of which is determined.

For example, when the radar signal modulated in Step S306 is sent out, the control unit 100 may adjust the cut-off frequencies of the first filter 221 and the second filter 223 and control the amplification gain of the amplification unit 222 in such a manner that the influence due to the vehicle's vibration, inclination, and movement is minimized, based on at least one of the following: the vehicle's vibration, inclination, or movement, each of which is determined (S308).

In this case, the control unit 100 may control the preprocessing unit 220 in such a manner that the reception sensitivity of the radar signal is reduced, in a case where at least one of the following exceeds a preset threshold: the vehicle's vibration, inclination, or movement. In this case, the control unit 100 may change at least one of the following: the first filter 221 or the second filter 223, in such a manner that the size of a frequency band that is allowed to pass through the first filter 221 and the second filter 223 is narrowed. In addition, the reception sensitivity of the radar signal may be reduced by decreasing the amplification gain. Accordingly, the decrease in the sensitivity of the radar signal may suppress the influence of disturbance due to the vehicle's vibration, inclination, and movement.

Conversely, in a case where at least one of the following is at or below the preset threshold: the vehicle's vibration, inclination, or movement, the influence of disturbance is insignificant. Thus, the control unit 100 may determine that more precise biosignal detection is possible. Therefore, the control unit 100 may control the preprocessing unit 220 in such a manner that the reception sensitivity of the radar signal increases. In this case, the control unit 100 may change at least one of the cut-off frequencies of the first filter 221 or the second filter 223 in such a manner that the size of the frequency band that is allowed to pass through the first filter 221 and the second filter 223 is broadened. In addition, the reception sensitivity of the radar signal may be increased by increasing the amplification gain. Accordingly, the increase in the sensitivity of the radar signal makes more precise biosignal detection possible.

An operation in Step S308 of adjusting the reception sensitivity of the radar signal based on at least one of the following: the vehicle's vibration, inclination, or movement, each of which is determined, is described in more detail below with reference to FIG. 10.

Then, the control unit 100 may analyze the radar reception signal for each occupant, which is preprocessed through the preprocessing unit 220. Based on the result of the analysis, each occupant's body state may be detected, and a change in the body state may be monitored (S310).

Then, the control unit 100 may determine whether or not the vehicle comes to a stop (S312). In order to determine whether or not the vehicle comes to a stop, the control unit 100 may determine whether or not the vehicle has come to a stop for a preset time or longer or whether or not at least one of the doors of the vehicle is open. Then, in a case where the vehicle has not come to a stop for the preset time or longer or where at least one of the doors of the vehicle is not open, proceeding back to Step S304 may take place, and the vehicular driving information and the vehicular state information, that is, the information (vehicular information) on the driven state of the vehicle, may be collected. Then, the operation in Step S306 of modulating the radar signal based on the collected vehicular information may be performed. Then, the operations from Step S306 to Step S312 may be repeatedly performed.

Conversely, in a case where the result of determining whether or not the vehicle comes to a stop in Step S312 is that the vehicle has come to a stop for the preset time or longer or that at least one of the doors of the vehicle is open, the control unit 100 may determine that the vehicle has come to a stop. Then, the operations in FIG. 3 may be ended. Then, in a case where it is detected that the vehicle starts to drive, the operational steps in FIG. 3 may be repeatedly performed.

Accordingly, in a case where the vehicle has come to a stop for a predetermined time or longer or where the door of the vehicle is open, Step S300 of detecting the occupant within the cabin of the vehicle and the steps subsequent thereto may be repeatedly performed. Therefore, Step S302 of distributing the antennas and determining the facing directions of the antennas according to the number, locations, postures, and other factors of the occupants, which vary according to the result of the detection in Step S300, may be repeatedly performed. Subsequently, the operations from Step S304 to Step S312 may be repeatedly performed.

As described above, the control unit 100 of the biosignal detection device 10 according to the embodiment of the present disclosure may distribute the antennas, which correspond to each occupant, based on the number of the detected occupants that result from detecting the occupants and may drive the antenna unit 200 in such a manner that the distributed antennas face toward each corresponding occupant. Then, as described above, in a case where the camera image of the cabin's interior is used to detect the occupants, the postures of the occupants may also be detected from the acquired camera image.

Figure 5:
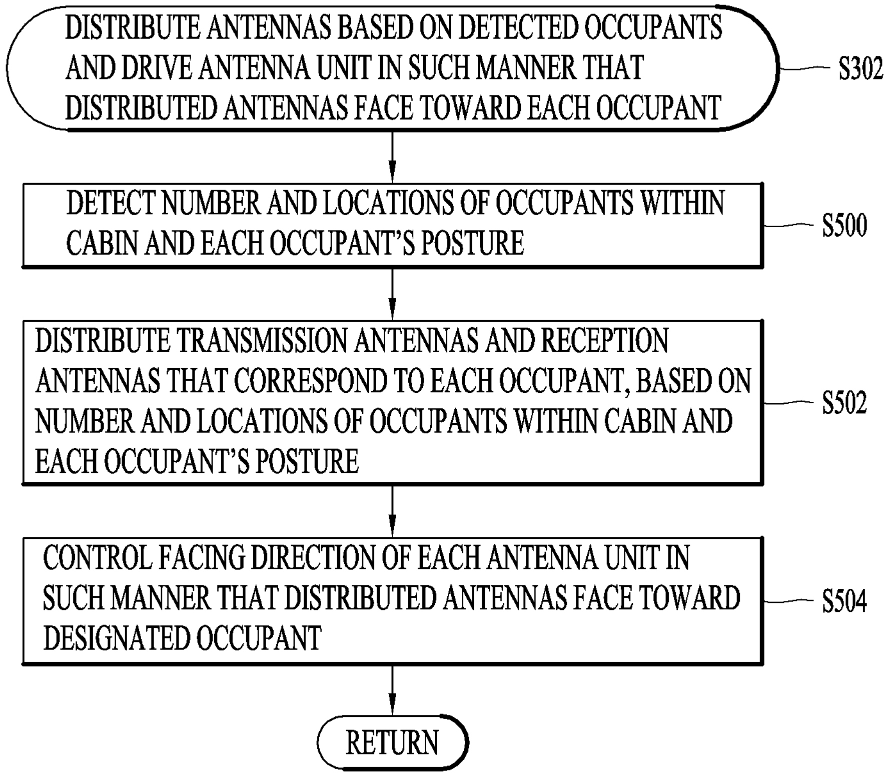
FIG. 5 is a flowchart illustrating operational steps of controlling an antenna unit in the biosignal detection device according to the embodiment of the present disclosure, based on an occupant detection result including occupants.
Figure 6:
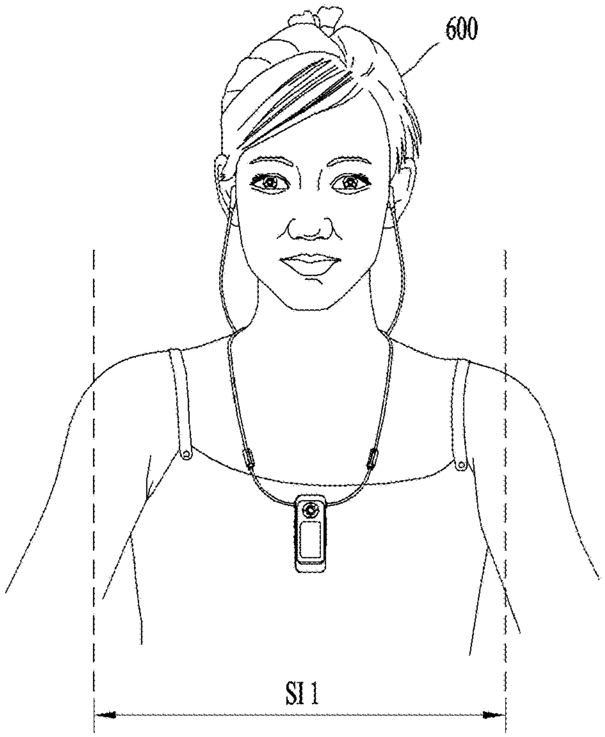
FIG. 6 is a view illustrating examples where the occupants' postures are determined according to the result of detecting the occupants in the operational steps in FIG. 5.
Figure 6:
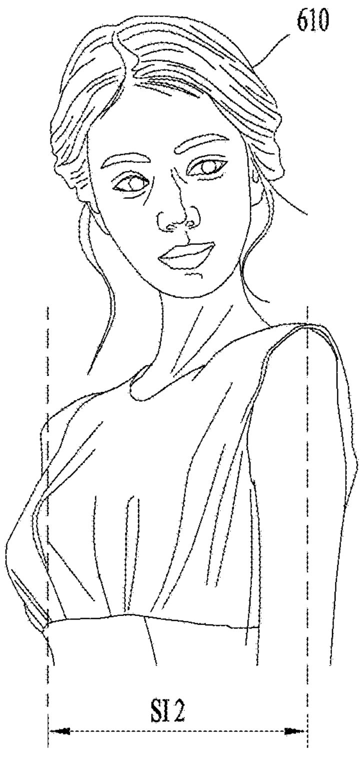
Figure 7:
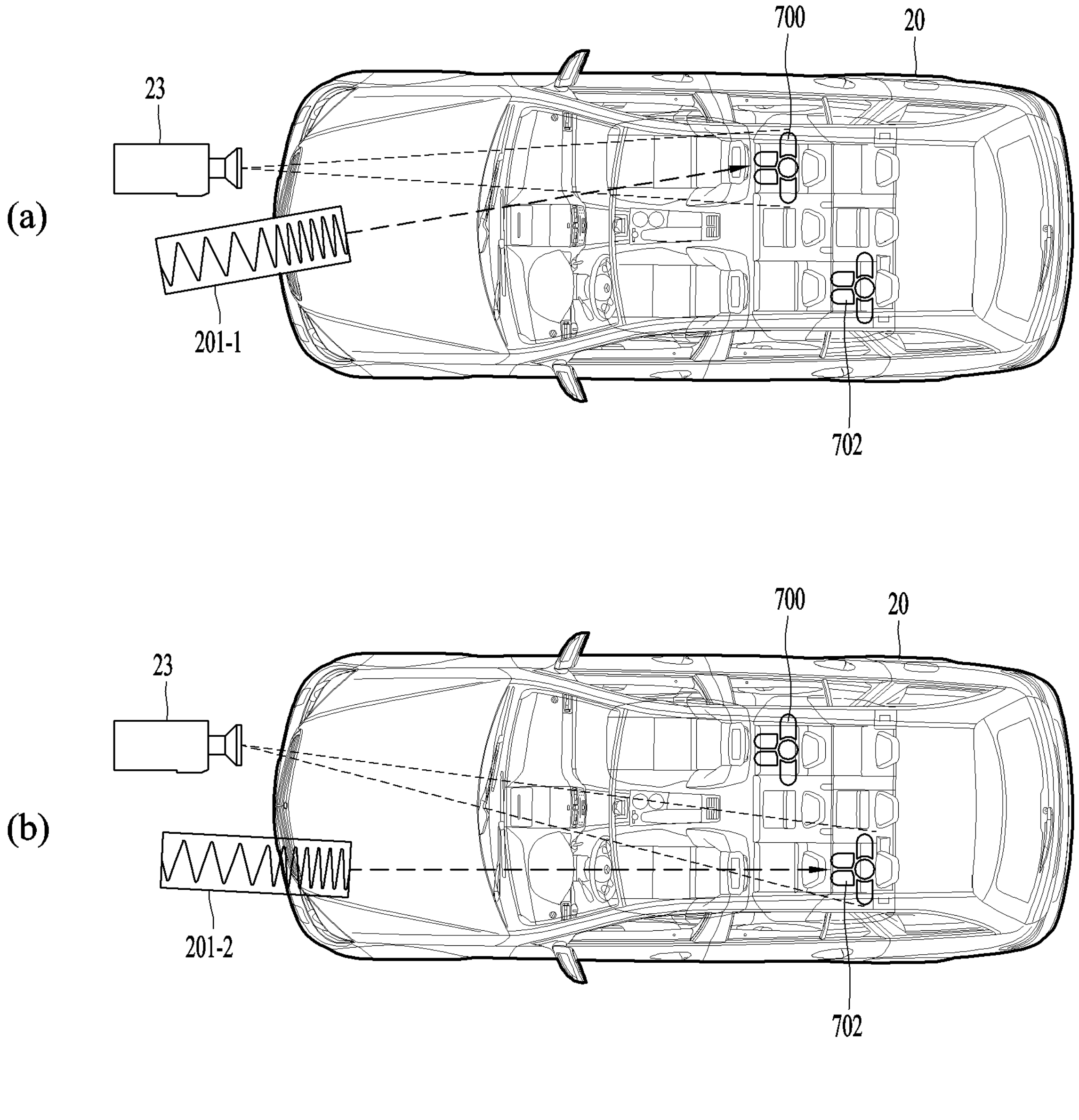
FIG. 7 is a view illustrating examples where the distributed antennas face toward different occupants, respectively.

FIG. 5 is a flowchart illustrating operational steps of controlling the antenna unit 200 in the biosignal detection device 10 according to the embodiment of the present disclosure in such a manner that the antennas are distributed to the occupants, based on the occupant detection result including the postures of the occupants. FIG. 6 is a view illustrating examples where the occupants' postures are determined according to the result of detecting the occupants in the operational steps in FIG. 5. FIG. 7 is a view illustrating examples where the distributed antennas face toward different occupants, respectively.

First, Step S302, illustrated in FIG. 3, of distributing the antennas based on the result of detecting the occupants and driving the antenna unit in such a manner that the distributed antennas face toward each occupant is performed with reference to FIG. 5. When Step S302 is performed, the control unit 100 of the biosignal detection device 10 may detect the number and locations of the occupants within the cabin based on at least one of the following: the result of sensing by the vehicular sensor unit 22 or the image acquired from the camera unit 23.

At this point, in a case where the occupants within the cabin are detected based on the image acquired from the camera unit 23, the control unit 100 may further determine each occupant's posture based on the acquired image. To this end, the control unit 100 may detect the size of an area (hereinafter referred to as a reflection area) where the reflection of the radar signal is possible, from each occupant's image included in the acquired image and may determine each occupant's posture based on the size of the detected reflection area.

As an example, as illustrated in (a) of FIG. 6, an occupant 600 sits in a state of correctly facing forward in an upright posture. In this case, the area where the reflection of the radar signal is possible in the image of the occupant 600 included in the acquired image, for example, the area of the occupant 600's chest portion, may be equal to or greater than a predetermined size. Conversely, as illustrated in (b) of FIG. 6, an occupant 610 sits in a twisted posture. In this case, the area of the occupant 610's chest portion in the image of the occupant 610 included in the acquired image may be smaller than the predetermined size.

In this case, even if the occupant is in the twisted posture, there may not be a significant change in the occupant's sitting height. Conversely, in the case where the occupant is in the twisted posture, as illustrated in (a) and (b) of FIG. 6, a distance SI 1 between the occupant 600's shoulders and a distance SI 2 between the occupant 610's shoulders are significantly different. Therefore, the areas of the occupant 600's chest portion and the occupant 610's chest portion, that is, the sizes of the reflection areas may be significantly different from each other. Therefore, the control unit 100 may detect a distance SI between the shoulders of each occupant from the image captured by the camera 23, which includes the image of the occupant within the cabin and may determine each occupant's posture based on the distance between the detected shoulders.

The control unit 100 may group at least one antennas into a plurality of groups according to the number and locations of the detected occupants based on the occupant detection result in Step S500 and may distribute the antennas in such a manner as to correspond to the number and locations of the occupants (S502). At this point, in a case where each occupant's posture is further determined in Step S500, the control unit 100 may vary the number of the antennas that are distributed according to each occupant's determined posture.

For example, as illustrated in (a) of FIG. 6, in the case of the occupant 600 who sits in the upright position, a wide reflection signal area is detected. Thus, with the radar signal that is sent out from a smaller number of the antennas, a precise reflection signal may also be received. Conversely as illustrated in (b) of FIG. 6, in the case of the occupant 610 who sits in the twisted posture, the reflection signal area is narrow. Thus, with the radar signal that is sent out from the same number of the antennas, it may be difficult to acquire a sufficient reflection signal. Therefore, a greater number of the antennas are distributed to the occupant 610 who sits in the twisted posture than the occupant 600 who sits in the upright posture. Thus, the antenna unit 200 may be controlled in such a manner that more radar signals are sent out toward the corresponding occupant. Accordingly, although the occupant sits in the twisted posture, the sufficient reflection signal may be acquired.

In this manner, the control unit 100 may determine each occupant's posture from the image of the occupant within the cabin, based on the distance between the occupant's shoulders and may vary the number of the antennas distributed to each occupant based on the occupant's determined posture. Therefore, even in a case where a sufficient reflection area is not formed due to the occupant's twisted posture, a sufficient reflection signal for detecting the corresponding occupant's biosignal may be acquired.

When, in Step S502, the plurality of transmission antennas and the plurality of reception antennas are distributed in such a manner as to correspond to each occupant, based on the number and locations of the occupants and on each occupant's posture, the control unit 100 may drive the antenna unit 200 in such a manner that each of the distributed antennas faces toward the corresponding occupant, that is, the designated occupant (S504). Therefore, under the control of the control unit 100, the direction in which each of the distributed antennas faces according to the location of the occupant corresponding to each antenna may be controlled. FIG. 7 illustrates examples where the facing direction of the antennas (for example, the transmission antennas) distributed in such a manner as to face toward the designated occupant in this manner is controlled.

FIG. 7 illustrates the examples where, in Step S504 in FIG. 5, the facing directions of the antennas distributed to the designated occupant in such a manner as to face toward the designated occupant is controlled.

With reference to (a) of FIG. 7, in a case where at least one first transmission antenna 201-1 is distributed to a first occupant 700 within the cabin of the vehicle 2, the antenna facing direction of the first transmission antenna 201-1 may be controlled in such a manner as to face in the direction which the first occupant 700 sits. In this case, as illustrated in (a) of FIG. 7, the location of the first occupant 700 within the cabin may be detected based on the image acquired from the camera unit 23 that acquires the image of the cabin's interior.

In a case where at least one second transmission antenna 201-2 is distributed to a second occupant 702 within the cabin of the vehicle 2, the antenna facing direction of the second transmission antenna 201-2 may be controlled in such a manner as to face in the direction in which the second occupant 702 sits. In this case, as illustrated in (b) of FIG. 7, the location of the second occupant 702 within the cabin may be detected based on the image acquired from the camera unit 23 that acquires the image of the cabin's interior.

At this point, the first transmission antenna 201-1 and the second transmission antenna 201-2 may be antennas included in one antenna unit 200. In this case, the antenna unit 200 may be an antenna that includes a plurality of internal antennas or a plurality of sub-antennas and thus is capable of Multi Input Multi Output (MIMO). In this case, the first transmission antenna 201-1 and the second transmission antenna 201-2 may be antennas that constitute a plurality of internal antennas or a plurality of sub-antennas that send out an output signal, that is, the radar signal in the MIMO antenna.

As an example, only the case of the transmission antenna is described above with reference to FIG. 7. However, the case of the reception antenna may, of course, be controlled in such a manner as to face toward each occupant's location in the same manner as illustrated in FIG. 7. In addition, of course, the number of the transmission antennas, distributed to each occupant, and the number of the reception antennas, distributed to each occupant, may not be the same. For example, the control unit 100 may perform the steps of distributing the antennas and controlling the facing directions thereof, which are illustrated in FIG. 5, for the plurality of the transmission antennas. In addition, separately from the plurality of transmission antennas, the plurality of reception antennas may also be distributed through the operational steps in FIG. 5 in such a manner as to correspond to each occupant, and the plurality of reception antennas may also be driven in such a manner as to face toward each occupant. In this case, the number of the transmission antennas, distributed to each occupant and facing toward each occupant, and the number of the reception antennas, distributed to each occupant and facing toward each occupant, may be different from each other.

As described above, the control unit 100 of the biosignal detection device 10 according to the embodiment of the present disclosure may generate and send out the radar signal that is robust against the vehicle's vibration, inclination, and movement, based on the vehicle's vibration, inclination, and movement, which are detected based on the vehicular driving information and the vehicular state information.

Figure 8:
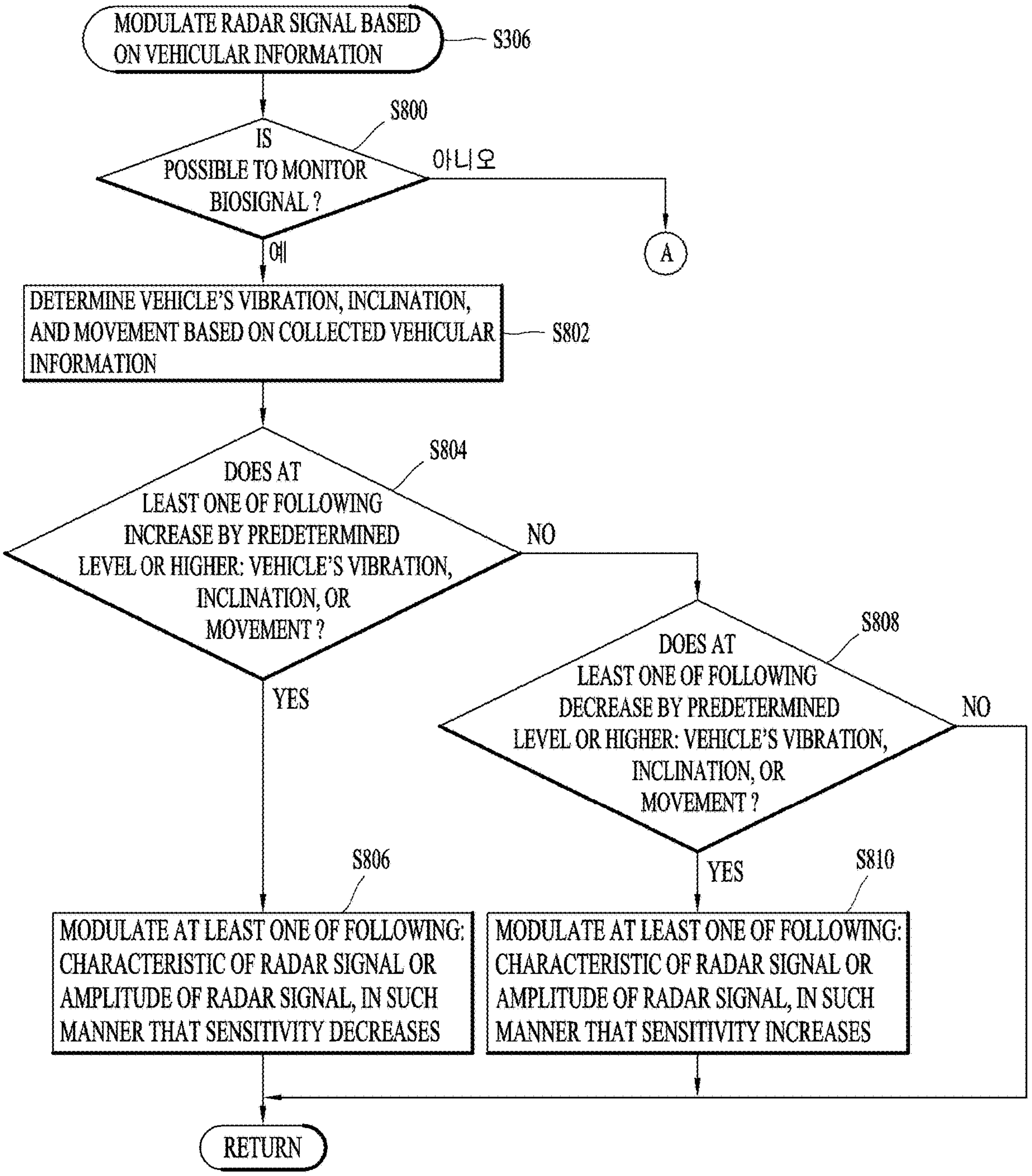
FIG. 8 is a flowchart illustrating operational steps of modulating a radar signal to be sent out to detect the occupant's biosignal based on the vehicular information, among the operational steps in FIG. 3.
Figure 9:
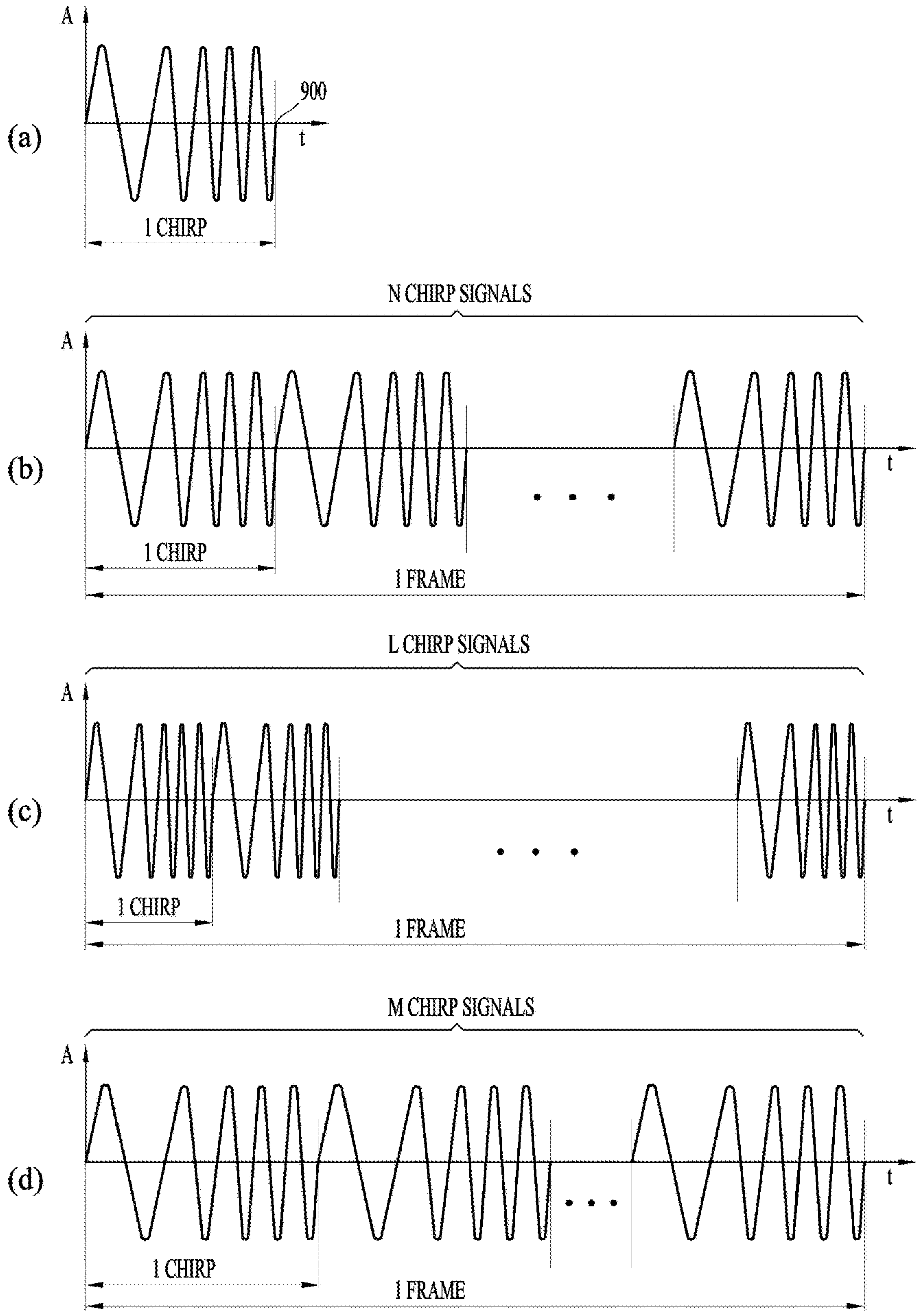
FIG. 9 is a view illustrating an example of a basic waveform of the radar signal and examples of a waveform of the radar signal modulated according to the operational steps in FIG. 8.

FIG. 8 is a flowchart illustrating operational steps of modulating the radar signal that is sent out to the occupant based on the vehicular information collected in this manner from the vehicle system 20. FIG. 9 is a view illustrating an example of a basic waveform of the radar signal and examples of a waveform of the radar signal modulated according to the operational steps in FIG. 8.

First, with reference to FIG. 8, when Step S306, illustrated in FIG. 3, of modulating the radar signal is entered, the control unit 100 may determine whether or not the occupant's biosignal is in a monitoring-possible state, based on at least one of the following: the vehicle's vibration, inclination, or movement, each of which is determined according to the vehicular information detected in Step S304 in FIG. 3 (S800).

In Step S800, the control unit 100 may determine that the occupant's biosignal is in a monitoring-impossible state, in a case where at least one of the following exceeds a preset threshold: the vehicle's vibration, inclination, or movement, each of which is determined. For example, in a case where at least one of the following is significantly high: the vehicle's vibration, inclination, or movement, it may be difficult to detect a precise biosignal due to the disturbance that occurs because of the vehicle's vibration, inclination, or movement.

Therefore, the control unit 100 may detect whether or not at least one of the following exceeds the preset threshold: the vehicle's vibration, inclination, or movement, each of which is determined, and thus may check in advance whether or not the biosignal is in a detectable state. Consequently, an unnecessary biosignal detection process may also be omitted. According to the present disclosure, the preset threshold here may be determined as an optimized value resulting from conducting tests multiple times. These tests are conducted to analyze the disturbance occurring to each of the following: the vehicle's vibration, inclination, and movement, which are different from one another, and to analyze the influence that the magnitude of the disturbance has on the detection of the biosignal.

As the thresholds here, different thresholds (for example, a vibration threshold, an inclination threshold, and a movement threshold) may be set for the vehicle's vibration, inclination, and movement, respectively. In this case, if, in Step S800, at least one of the following exceeds a correspondingly set threshold: the vehicle's vibration, inclination, or movement, the control unit 100 may determine that the biosignal is in a non-detectable state.

In a case where, in Step S800, it is determined that the biosignal is in the monitoring-impossible state, based on at least one of the following: the vehicle's vibration, inclination, or movement, each of which is determined, the control unit 100 may determine at least one of the following: the vehicle's vibration, inclination, or movement, based on the vehicular information collected from the vehicle system 20 (S802).

For example, based on the vehicular driving information, the control unit 100 may detect an accelerating or decelerating state of the vehicle, a brake or non-brake state, a rotational state (for example, a rotational angle or an angular speed) of the vehicle, and other factors. Then, based on a change in the vehicle's posture and the vehicle's inclination according to the vehicular state information, the control unit 100 may detect the vehicle's vibration and inclination in the vertical direction or in the horizontal direction.

Then, the control unit 100 may determine whether or not at least one of the following: the vehicle's movement, vibration, or inclination, each of which is detected, has increased, by a predetermined level or higher, more than at least one of the following: the vehicle's movement, vibration, or inclination, each of which is previously determined (S804).

Then, in a case where the result of the determination in Step S804 is that at least one of the following: the vehicle's vibration, inclination, or movement, each of which is determined in Step S802, has increased, by a predetermined level or higher, more than at least one of the following: the vehicle's vibration, inclination, or movement, each of which is previously determined, at least one of the following: the signal characteristic of the radar signal or the amplitude of the radar signal may be modulated in such a manner that the sensitivity of the radar signal for detecting the occupant's biosignal decrease (S806).

At this point, the signal characteristic of the radar signal, which can determine the sensitivity of the occupant's biosignal, may be at least one of the following: the number of the chirp signals, which are included in one frame of the radar signal, the idle time, or the bandwidth of the chirp signal. In addition, the signal characteristic of the radar signal, which can determine the sensitivity of the occupant's biosignal may be at least one of the following: the sending-out period of the radar signal, TX Start Time of the radar signal, or the time taken to send out the radar signal.

At this point, the chirp signal functions as a unit signal that constitutes one frame of the radar signal and, as illustrated in (a) of FIG. 9, may be a signal having a waveform that increases over time from a preset minimum frequency to a preset maximum frequency. Therefore, in the biosignal detection device 10 according to the embodiment of the present disclosure, as illustrated in (b) of FIG. 9, the radar signal that is sent out to detect the occupant's biosignal may be a signal of which a preset number of unit signals (chirp), each having a wavelength of a frequency that increases over time from the preset minimum frequency to the preset maximum frequency, are transmitted successively.

The radar signal may be sent out on a per-frame basis. As an example, as illustrated in (b) of FIG. 9, n chirp signals may be successively transmitted, and thus a signal in one frame may be generated. In this case, the greater the number of the chirp signals constituting one frame, the more signals are reflected from the occupant. As a result, the sensitivity for detecting the occupant's biosignal may increase. Conversely, the smaller the number of the chirp signals, the fewer signals are reflected from the occupant. As a result, the sensitivity for detecting the occupant's biosignal may decrease.

Therefore, the number of the chirp signals constituting one frame may become a signal characteristic of the radar signal. In this case, the number of the chirp signals included in one frame may also be determined based on Ramp End Time, which indicates when the chirp signal ends within one frame. Therefore, Ramp End Time, when the chirp signals ends within the frame, may also be a signal characteristic of the radar signal that determines the sensitivity for detecting the occupant's biosignal.

Then, when the radar signal in one frame is transmitted, the radar unit 110 may send out the radar signal on a per-frame basis by transmitting the radar signal in the next frame after a predetermined time has passed. In this case, a time interval occurs between the frames of the radar signals, which may be referred to as the idle time. In this case, when the idle time is short, more radar signals are sent out in a per-frame basis within the same time. As a result, the sensitivity for detecting the occupant's biosignal may increase.

Conversely, when the idle time is long, fewer signals are sent out on a per-frame basis within the same time. As a result, the sensitivity for detecting the occupant's biosignal can decrease. Therefore, the time interval between the frames, that is, the idle time, may also be a signal characteristic of the radar signal.

The occupant's biosignal may be determined by the movement of the occupant's body that is detected from the radar signal reflected from the occupant's body. At this point, the movement of the occupant's body is determined by the speed at which the occupant's body moves and the distance that the occupant's body moves. As in the following Mathematical Equation 1, the speed at which the occupant's body moves may be determined according to the wavelength of the radar signal and the number of the chirp signals constituting one frame. As in the following Mathematical Equation 2, the distance that the occupant's body moves may be determined according to the bandwidth of the chirp signal.

$$V_{res} = \frac{\lambda}{2T_f} \quad \text{[Mathematical Equation 1]}$$

In Mathematical Equation 1, $V_{res}$ depicts the speed at which the occupant's body moves, λ depicts the wavelength of the radar signal, and $T_f$ depicts the number of the chirp signals constituting one frame.

$$d_{res} = \frac{c}{2B} \quad \text{[Mathematical Equation 2]}$$

In Mathematical Equation 2, $d_{res}$ depicts the distance that the occupant's body moves, c depicts the speed of light, and B depicts the bandwidth of the chirp signal.

Therefore, the bandwidth of the chirp signal may be inversely proportional to the detection precision of the occupant's biosignal. That is, the broader the bandwidth of the chirp signal, the smaller the detected distance that the occupant's body moves may be. Accordingly, the sensitivity for detecting the occupant's biosignal may decrease. Conversely, the narrower the bandwidth of the chirp signal, the greater the detected distance that the occupant's body moves may be. Accordingly, the sensitivity for detecting the occupant's biosignal may increase. Therefore, the bandwidth of the chirp signal may also be a signal characteristic of the radar signal that can determine the sensitivity of the occupant's biosignal.

The signal characteristic of the radar signal that can determine the sensitivity of the occupant's biosignal may be at least one of the following: the sending-out period of the radar signal, TX Start Time of the radar signal, or ADS Start Time.

At this point, the send-out period of the radar signal may refer to a period with which the radar signal corresponding to a preset number of frames is sent out. Therefore, the shorter the sending-out period, the more frames are sent out within the same time. As a result, the sensitivity for detecting the occupant's biosignal may increase. Conversely, the longer the sending-out period, the fewer frames are sent out within the same time. As a result, the sensitivity for detecting the occupant's biosignal may decrease. Therefore, the sending-out period of the radar signal may also be a signal characteristic of the radar signal.

TX Start Time of the radar signal and ADC Start Time may also be signal characteristics that determine the sensitivity for detecting the occupant's biosignal according to the radar signal to be sent out. For example, the shorter TX Start Time of the radar signal and ADC Start Time, the faster the radar signal may be sent out. Therefore, the number of radar signals that can be sent out may increase. Accordingly, the sensitivity for detecting the occupant's biosignal may increase. Conversely, the longer TX Start Time of the radar signal and ADC Start Time, the later the radar signal may be transmitted. Therefore, the number of radar signals that can be sent out may decrease. Accordingly, the sensitivity for detecting the occupant's biosignal may decrease.

The amplitude of the radar signal may also be a factor that determines the sensitivity for detecting the occupant's biosignal. For example, the greater the amplitude of the radar signal, the greater the amplitude of the radar signal reflected from the occupant's body and received may be. Therefore, the sensitivity for detecting the occupant's biosignal may increase. Conversely, the smaller the amplitude of the radar signal, the smaller the amplitude of the radar signal reflected from the occupant's body and received may be. Therefore, the sensitivity for detecting the occupant's biosignal may decrease.

Therefore, in a case where the result of the determination in Step S804 is that at least one of the following: the vehicle's vibration, inclination, or movement, each of which is determined in Step S802, has increased, by a predetermined level or higher, more than the vehicle's vibration, inclination, and movement, which are previously detected, the control unit 100 may modulate at least one of the following: the signal characteristic of the radar signal or the amplitude of the radar signal, in such a manner that the sensitivity for detecting the occupant's biosignal decreases.

For example, the control unit 100 may control the radar unit 110, more specifically, the chirp frame modulation unit 213 in such a manner that the number of the chirp signals included within one frame of the radar signal decreases. That is, as illustrated in (d) of FIG. 9, the number of the chirp signals included in one frame may change to M that is smaller than n, illustrated in (b) of FIG. 9.

To this end, the control unit 100 may decrease the number of the chirp signals included within one frame by changing Ramp End Time of the chirp signal within the frame.

Alternatively, in Step S806, the control unit 100 may modulate the radar signal in such a manner that the bandwidth of the chirp signal within the frame increases.

Alternatively, in Step S806, the control unit 100 may modulate the radar signal in such a manner that the time interval between the frames of the radar signals, that is, the idle time, increases. In this case, the sending-out period of the radar signal may be extended.

Alternatively, in Step S806, the control unit 100 may increase at least one of the following: TX Start Time of the radar signal or ADC Start Time.

Moreover, in Step S806, the control unit 100 may decrease the amplitude of the radar signal.

In this manner, the control unit 100 may modulate at least one of the following: the signal characteristic of the radar signal or the amplitude of the radar signal according to the vehicle's vibration, inclination, and movement, which are detected from the vehicle. Thus, the control unit 100 may send out the radar signal that enables the acquisition of the result of detecting the occupant's biosignal robust against disturbances that increase with the vehicle's vibration, inclination, and movement.

In a case where the result of the determination in Step S804 is that at least one of the following: the vehicle's vibration, inclination, or movement, each of which is determined in Step S802, has not increased, by a predetermined level or higher, more than the vehicle's vibration, inclination, and movement, which are previously detected, the control unit 100 may determine whether or not at least one of the following: the vehicle's vibration, inclination, or movement, each of which is determined in Step S802, has decreased, by a predetermined level or higher, than the vehicle's vibration, inclination, and movement, which are previously detected (S808).

Then, in a case where the result of the determination in Step S808 is that a difference between at least one of the following: the vehicle's vibration, inclination, or movement, each of which is determined in Step S802, and at the least one of the following: the vehicle's vibration, inclination, or movement, each of which is previously detected, is below the predetermined level, the control unit 100 may determine that a current modulated state of the radar signal needs to be maintained. Therefore, the control unit 100 may proceed to Step S308 and the steps subsequent thereto in FIG. 3 without additionally modulating the radar signal. Therefore, the modulated state of at least one of the following: the signal characteristic of the radar signal or the amplitude of the radar signal may be maintained.

Conversely, in a case where the result of the determination in Step S808 is that the vehicle's vibration, inclination, and movement have decreased by a predetermined level or higher, the control unit 100 may increase the sensitivity for detecting the occupant's biosignal and thus may modulate at least one of the following: the signal characteristic of the radar signal or the amplitude of the radar signal, in such a manner that more precise biosignal detection is possible (S810).

For example, the control unit 100 may control the chirp frame modulation unit 213 in such a manner that the number of the chirp signals included within one frame of the radar signal increases. That is, as illustrated in (c) of FIG. 9, the number of the chirp signals included in one frame may change to L that is greater than n, illustrated in (b) of FIG. 9.

To this end, the control unit 100 may decrease the number of the chirp signals included within one frame by changing Ramp End Time of the chirp signal within the frame.

Alternatively, in Step S810, the control unit 100 may modulate the radar signal in such a manner that the bandwidth of the chirp signal within the frame decreases.

Alternatively, in Step S810, the control unit 100 may modulate the radar signal in such a manner that the time interval between the frames of the radar signals, that is, the idle time, decreases. In this case, the sending-out period of the radar signal may be shortened.

Alternatively, in Step S810, the control unit 100 may decrease at least one of the following: TX Start Time of the radar signal or ADC Start Time.

Moreover, in Step S806, the control unit 100 may increase the amplitude of the radar signal.

In this manner, the control unit 100 may modulate at least one of the following: the signal characteristic of the radar signal or the amplitude of the radar signal according to the vehicle's vibration, inclination, and movement, which further decrease. Thus, the control unit 100 may send out the radar signal that enables more precise detection of the occupant's biosignal than when the vehicle's vibration, inclination, and movement are high.

The biosignal detection device 10 according to the embodiment of the present disclosure may send out the radar signal that enables the acquisition of the result of detecting the occupant's biosignal robust against the disturbances that occur due to the vehicle's vibration, inclination, and movement that are detected from the vehicle through the operational steps illustrated in FIG. 8. In addition, in a case where the vehicle's vibration, inclination, and movement, which are detected, decrease, the biosignal detection device 10 may send out the radar signal that enables more precise detection of the occupant's biosignal. Accordingly, by performing only the steps of sending out the radar signal, which are illustrated in FIG. 8, the radar signal to be sent out may be dynamically modulated in response to the vehicle's vibration, inclination, or movement, thereby acquiring the occupant's biosignal more robust against the disturbance or more precise.

Moreover, the control unit 100 of the biosignal detection device 10 according to the embodiment of the present disclosure may modulate the radar signal to be sent out. Additionally, as illustrated in Step S310 in FIG. 3, the control unit 100 may also control the process of preprocessing the radar signal reflected from the occupant's body and received, before analyzing the biosignal, based on at least one of the following: the vehicle's vibration, inclination, or movement, each of which is detected. As a result, the effect of enabling the biosignal to be detected in a manner more robust against the disturbance or the effect of making more precise biosignal detection possible may be enhanced.

Figure 10:
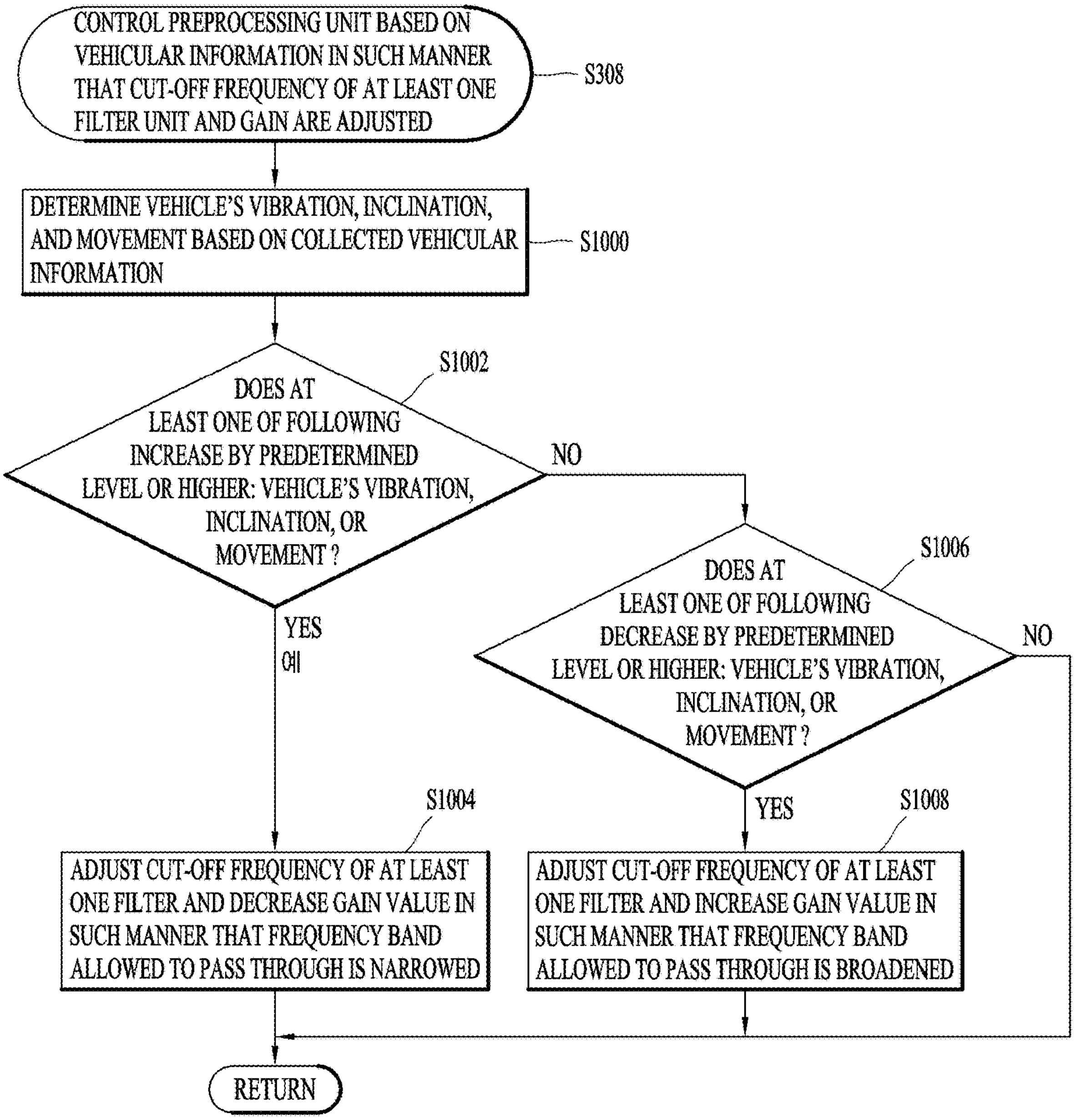
FIG. 10 is a flowchart illustrating operational steps of performing preprocessing based on the vehicular information before detecting the biosignal from a received reflection signal, among the operations steps in FIG. 3.

FIG. 10 is a flowchart illustrating operational steps of controlling preprocessing of the radar reception signal in such a manner as to enable the detection of the biosignal that is robust against the disturbance or more precise.

With reference to FIG. 10, when Step S308, illustrated in FIG. 3, of preprocessing the received radar signal is entered, the control unit 100 of the biosignal detection device 10 according to the embodiment of the present disclosure may determine at least one of the following: the vehicle's vibration, inclination, or movement, based on the vehicular information collected from the vehicle system 20 (S1000).

Then, the control unit 100 may determine whether or not at least one of the following: the vehicle's movement, vibration, or inclination, each of which is detected in Step S1000, has increased, by a predetermined level or higher, more than at least one of the following: the vehicle's movement, vibration, or inclination, each of which is previously determined (S1002).

Then, in a case where the result of the determination in Step S1002 is that at least one of the following: the vehicle's movement, vibration, or inclination, each of which is detected in Step S1000, has increased, by a predetermined level or higher, more than at least one of the following: the vehicle's movement, vibration, or inclination, each of which is previously determined, at least one of the following: the first filter 221 or the second filter 223 of the preprocessing unit 220 may be controlled in such a manner as to enhance a filtering effect in order to reduce the influence caused by the disturbance. Then, the amplification unit 222 may be controlled in such a manner as to decrease the amplification gain (S1004).

Therefore, the control unit 100 may decrease the cut-off frequency of the first filter 221, which is a low-pass filter, or may decrease the gain of the amplification unit 222. In addition, the control unit 100 may decrease the size of the frequency band that is allowed to pass through the second filter 223, by decreasing the upper cut-off frequency of the second filter 223, which is a band-pass filter, or increasing the lower cut-off frequency. Therefore, a frequency band that enables detection decreases, thereby facilitating the detection of the radar signal corresponding to the biosignal. As a result, even in a case where the significant disturbance due to the driving of the vehicle occurs, precise monitoring of the occupant's body state may be made possible.

However, in a case where the result of the determination in Step S1002 is that at least one of the following: the vehicle's movement, vibration, or inclination, each of which is detected in Step S1000 has not increased, by a predetermined level or higher, more than at least one of the following: the vehicle's movement, vibration, or inclination, each of which is previously determined, the control unit 100 may determine whether or not at least one of the following: the vehicle's movement, vibration, or inclination, each of which is detected in Step S1000, has decreased, by a predetermined level or higher, more than at least one of the following: the vehicle's movement, vibration, or inclination, each of which is previously determined (S1006).

Then, in a case where the result of the determination in Step S1006 is that a difference between at least one of the following: the vehicle's vibration, inclination, or movement, each of which is determined in Step S1000, and at least one of the following: the vehicle's vibration, inclination, or movement, each of which is previously detected, is below a predetermined level, the control unit 100 may determine that a current controlled state of the preprocessing unit 220 needs to be maintained. Therefore, the control unit 100 may maintain controlled states of the first filter 221, the second filter 223, and the amplification unit 222 as they are. Therefore, the frequency band that is allowed to pass through the first filter 221 and the second filter 223, and the amplification gain of the reception signal may be maintained as they are.

Conversely, in a case where the result of the determination in Step S1006 is that the vehicle's vibration, inclination, and movement have decreased by a predetermined level or higher, the control unit 100 may alleviate the filtering effects of the first filter 221 and the second filter 223 by detecting a subtle change in the biosignal in such a manner that more precise biosignal detection is possible. Then, the amplification unit 222 may be controlled in such a manner that the amplification gain increases (S1008).

To this end, the control unit 100 may increase the cut-off frequency of the first filter 221, which is a low-pass filter, or may increase the gain of the amplification unit 222. In addition, the control unit 100 may increase the size of the frequency band that is allowed to pass through the second filter 223, by increasing the upper cut-off frequency of the second filter 223, which is a band-pass filter, or decreasing the lower cut-off frequency. Therefore, the reception signal corresponding to a more subtle change in the biosignal may be detected by increasing the frequency band that enables detection. Therefore, the occupant's biosignal may be detected in a more precise manner.

Step S1002 described above may be a step of loading at least one of the following: the vehicle's vibration, inclination, or movement, each of which is detected in Step S802 in FIG. 8. In this case, the vehicle's vibration, inclination, or movement, each of which is detected in Step S802 in FIG. 8 is used as it is. Therefore, of course, at least one of the following: the vehicle's vibration, inclination, or movement, does not need to be detected again.

The operational steps are described above. In Step S308 in FIG. 3, at least one of the following: the signal characteristic of the radar signal or the amplitude of the radar signal is modulated based on at least one of the following: the vehicle's vibration, inclination, or movement. In addition, in Step S310 in FIG. 3, the radar signal that is received is preprocessed based on at least one of the following: the vehicle's vibration, inclination, or movement. However, of course, only one of the following steps may also be performed: Step S308 (for example, the operational step in FIG. 8) in FIG. 3, or Step S310 (for example, the operational step in FIG. 10).

As an example, in a case where only Step S308 in FIG. 3 (for example, the operational step in FIG. 8) is performed, the control unit 100 may control the preprocessing unit 220 in such a manner that, in Step S310 in FIG. 3, additional preprocessing is not performed on the radar reception signal. In this case, cut-off frequencies may be set to their default values for the first filter 221 and the second filter 223 of the preprocessing unit 220. In addition, the amplification gain of the amplification unit 222 may also be set to its default value.

In contrast, in a case where only Step S310 in FIG. 3 (for example, the operational step in FIG. 10) is performed, of course, the control unit 100 may not perform modulation on the signal characteristic of the radar signal and the amplitude of the radar signal in Step S308 in FIG. 3. In this case, in Step S308 in FIG. 3, the control unit 100 may control the signal generation unit 210 in such a manner as to send out the radar signal that is set to default values for the following: the number or end times of the chirp signals included in one frame, the idle time, the bandwidth of the chirp signal, the sending-out period or sending-out time of the radar signal, ADC Start Time, and other related factors. In addition, the signal generation unit 210 may also be controlled in such a manner as to send out the radar signal having a preset default amplitude.

The present disclosure can be implemented as computer-readable codes in a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may also include a control unit 100 of a biosignal detection device 10 according to an embodiment of the present disclosure.

Therefore, the detailed description should not be limitedly construed in all of the aspects, and should be understood to be illustrative. The scope of the present disclosure should be determined by reasonable interpretation of the appended claims, and all changes within the equivalent scope of the present disclosure are embraced by the appended claims.

The invention claimed is:

1. A biosignal detection device for detecting a biosignal of at least one occupant riding in a cabin of a vehicle, the biosignal detection device comprising:

an interface unit that receives, from the vehicle, vehicular information about a posture, inclination, and movement of the vehicle, and occupant detection information obtained by detecting the at least one occupant within the cabin;

a detection signal transmission and reception unit that includes a plurality of antennas, sends out a detection signal for detecting a biosignal of each occupant within the cabin, and receives the detection signal reflected from each occupant's body; and a control unit that controls the detection signal transmission and reception unit in such a manner that a number of occupants within the cabin and a location of each occupant are detected based on the occupant detection information, that the plurality of antennas is distributed according to the number and locations of the detected occupants in a manner that corresponds to each occupant, that a vehicular state including at least one of a vibration, inclination, or movement of the vehicle, is detected based on the vehicular information, and that, based on the detected vehicular state, at least one signal characteristic of the detection signal associated with a detection sensitivity of each occupant's biosignal, are modulated and sent out, wherein the control unit controls the detection signal transmission and reception unit in such a manner as to preprocess the received detection signal, and each occupant's biosignal is obtained from the received detection signal.

2. The biosignal detection device of claim 1, wherein the control unit controls the detection signal transmission and reception unit in such a manner as to preprocess the received detection signal based on the detected vehicular state before detecting each occupant's biosignal from the detection signal reflected from each occupant's body.

3. The biosignal detection device of claim 2, wherein the detection signal transmission and reception unit comprises:

a preprocessing unit that includes at least one filter and an amplification unit controlling a gain of the received detection signal, and wherein the control unit changes at least one of a range of frequency bands, which are allowed to pass through the at least one filter, or the gain of the amplification unit, based on the detected vehicular state, in such a manner that the detection sensitivity of at least one of the occupants's biosignal increases or decreases.

4. The biosignal detection device of claim 3, wherein the control unit controls the preprocessing unit in such a manner that, when at least one of the vehicle's vibration, inclination, or movement increases, the range of frequency bands, which are allowed to pass through the at least one filter, is narrowed, or that the gain decreases, and wherein the control unit controls the preprocessing unit in such a manner that, when at least one of the vehicle's vibration, inclination, or movement decreases, the range of frequency bands allowed to pass through the at least one filter is broadened, or that the gain increases.

5. The biosignal detection device of claim 1, wherein the at least one signal characteristics of the detection signal includes at least one of a number of unit signals constituting one frame of the detection signal, a bandwidth of the unit signal, a period of the detection signal to be sent out, or an amplitude of the detection signal.

6. The biosignal detection device of claim 5, wherein the control unit controls the detection signal transmission and reception unit in such a manner that, when at least one of the vehicle's vibration, inclination, or movement increases, at least one of the following occurs:

the number of unit signals constituting one frame of the detection signal decreases, the amplitude of the detection signal decreases, a sending-out period of the detection signal increases, or the bandwidth of the unit signal increases, and wherein the control unit controls the detection signal transmission and reception unit in such a manner that, when at least one of the vehicle's vibration, inclination, or movement decreases, at least one of the following occurs:

the number of unit signals constituting one frame of the detection signal increases, the amplitude of the detection signal increases, a sending-out period of the detection signal decreases, or the bandwidth of the unit signal decreases.

7. The biosignal detection device of claim 6, wherein the control unit controls the detection signal transmission and reception unit in such a manner that a time (Ramp End Time) corresponding to the unit signal within the one frame is changed to vary the number of the unit signals constituting the one frame, or that at least one of a time interval (idle time) between frames of the detection signals, TX Start Time of the detection signal, or Analog-Digital Converting (ADC) Start Time is changed to vary the sending-out period of the detection signal.

8. The biosignal detection device of claim 5, wherein the detection signal transmission and reception unit is a radar unit that sends out a radar signal and receives the radar signal reflected from each occupant's body, and wherein the unit signal is a chirp signal whose frequency increases over time.

9. The biosignal detection device of claim 1, wherein the vehicular information includes vehicular driving information, including information about traveling direction, speed change, rotation direction, and rotational angle of the vehicle, and vehicular posture information about posture and inclination of the vehicle.

10. The biosignal detection device of claim 1, wherein the control unit controls the detection signal transmission and reception unit in such a manner that posture of each occupant is determined from the occupant detection information and that a number of the antennas distributed to each occupant is varied based on each occupant's determined posture.

11. The biosignal detection device of claim 9, wherein the control unit detects a distance between each occupant's shoulders from each occupant's image included in the occupant detection information and determines each occupant's posture based on the detected distance between each occupant's shoulders.

12. The biosignal detection device of claim 1, wherein the detection signal transmission and reception unit is a LiDAR unit that sends out and receives a LIDAR signal in order to detect each occupant's biosignal.

13. The biosignal detection device of claim 1, further comprising:

an artificial intelligence unit that, when a scheduled travel path for the vehicle is set, predicts at least one of the vehicle's vibration, inclination, or movement on one section of a path that the vehicle will travel after a preset time, from the set scheduled travel path, wherein, in a case where the vehicle enters one section of the scheduled travel path, the control unit controls the detection signal transmission and reception unit based on at least one of the following:

the vehicle's vibration, inclination, or movement, each of which is predicted through the artificial intelligence unit.

14. A method of controlling a biosignal detection device for detecting a biosignal of at least one occupant riding in a cabin of a vehicle, the method comprising:

receiving, from the vehicle, occupant detection information obtained by detecting the at least one occupant;

distributing a plurality of antennas, which transmit and receive a detection signal for detecting a biosignal of the at least one occupant, to at least one group according to an occupant detection result and controlling a direction in which each antenna group resulting from the distribution faces;

receiving, from the vehicle, vehicular information that includes driving information associated with driving of the vehicle, and posture information associated with a posture of the vehicle;

detecting the vehicle's vibration, inclination, or movement based on the received vehicular information;

modulating at least one signal characteristic of the detection signal associated with a detection sensitivity of each occupant's biosignal based on the vehicle's detected movement;

sending out the modulated detection signal in the direction in which each antenna group faces;

receiving the detection signal reflected from each occupant's body; and analyzing the received detection signal such that each occupant's biosignal is obtained, analyzing each occupant's biosignal, and monitoring each occupant's body state based on the result of the analysis.

15. The method of claim 14, wherein the at least one signal characteristic includes at least one of a number of unit signals constituting one frame of the detection signal, a bandwidth of the unit signal, a period of the detection signal to be sent out, or an amplitude of the detection signal.

16. The method of claim 14, wherein receiving the detection signal comprises:

filtering the received detection signal through a first filter with a range of frequency bands that are adjusted to be allowed to pass through, based on a vehicular state including at least one of the vehicle's vibration, inclination, or movement, each of which is detected;

amplifying the detection signal passing through the first filter, based on a gain that varies according to the vehicular state; and filtering the received detection signal through a second filter with a range of frequency bands that are allowed to pass through, based on the vehicular state, and wherein the first filter is a low-pass filter, and the second filter is a band-pass filter.

17. The method of claim 14, wherein distributing the plurality of antennas to at least one group and controlling the direction in which each antenna group resulting from the distribution faces comprises:

determining each occupant's posture from the occupant detection information; and distributing a varying number of antennas corresponding to each occupant based on each occupant's determined posture.

18. The method of claim 17, wherein each occupant's posture is determined based on a distance between each occupant's shoulders that are detected from an image of each occupant within the cabin, which is included in the occupant detection information.

19. The method of claim 14, wherein the detection signal is a radar signal or a LiDAR signal.

* * * * *